Figure 3:
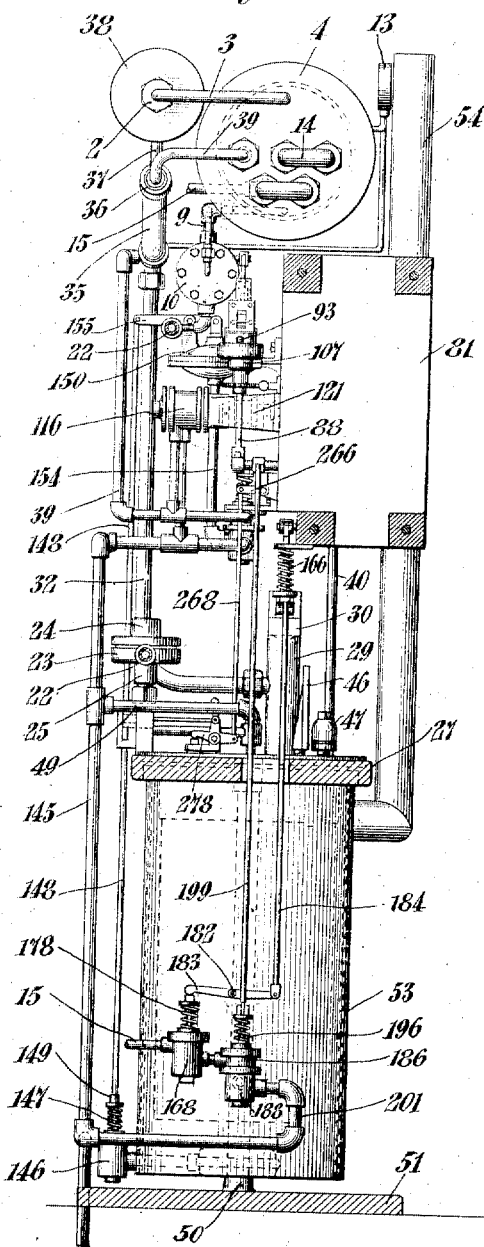

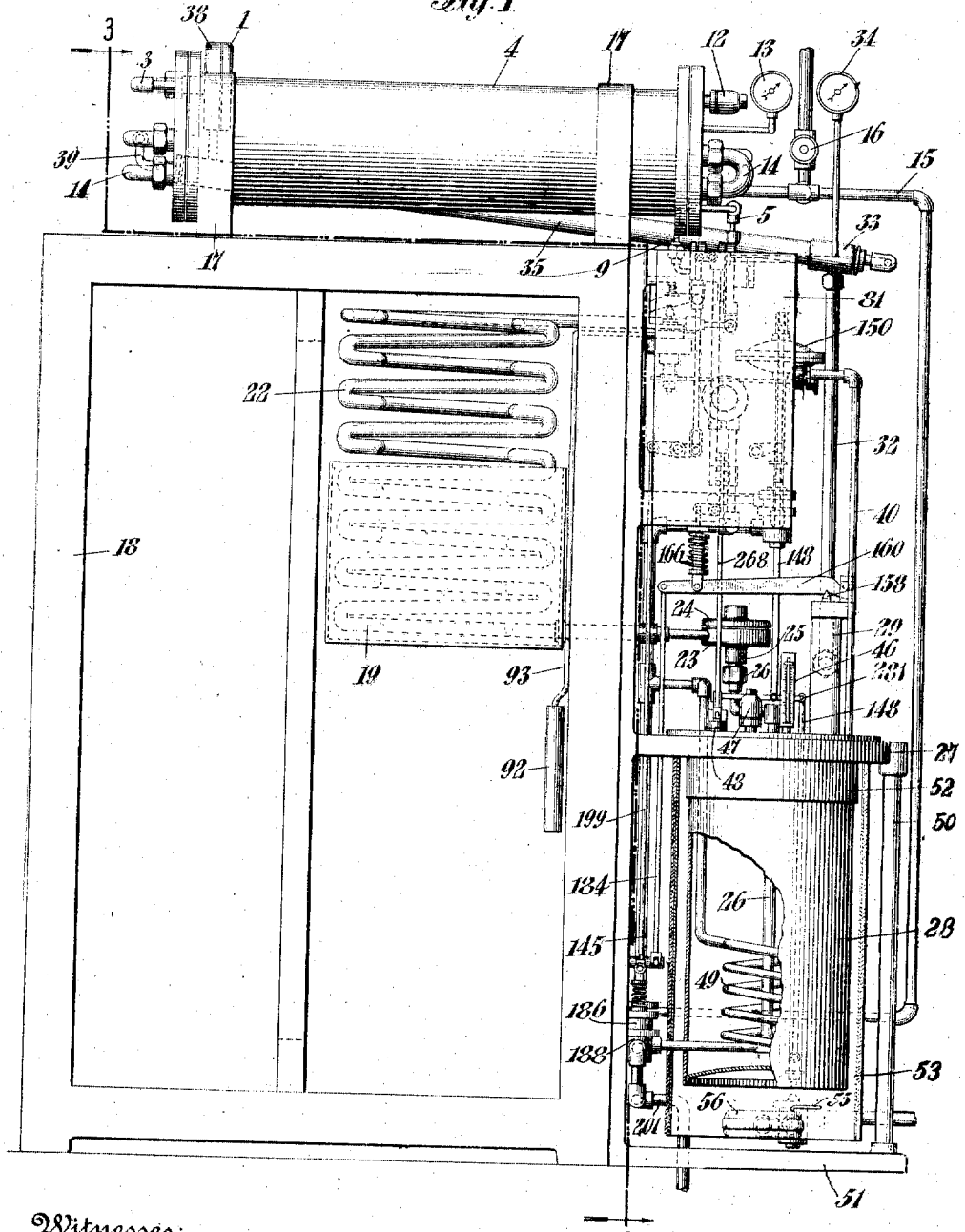

G. P. CARROLL.
REFRIGERATING MACHINE.
APPLICATION FILED JAN. 18, 1915.

1,217,084.

Patented Feb. 20, 1917.
10 SHEETS—SHEET 2.

Witnesses:
John E. Prager
A. Worden Gibbs

Inventor
George P. Carroll

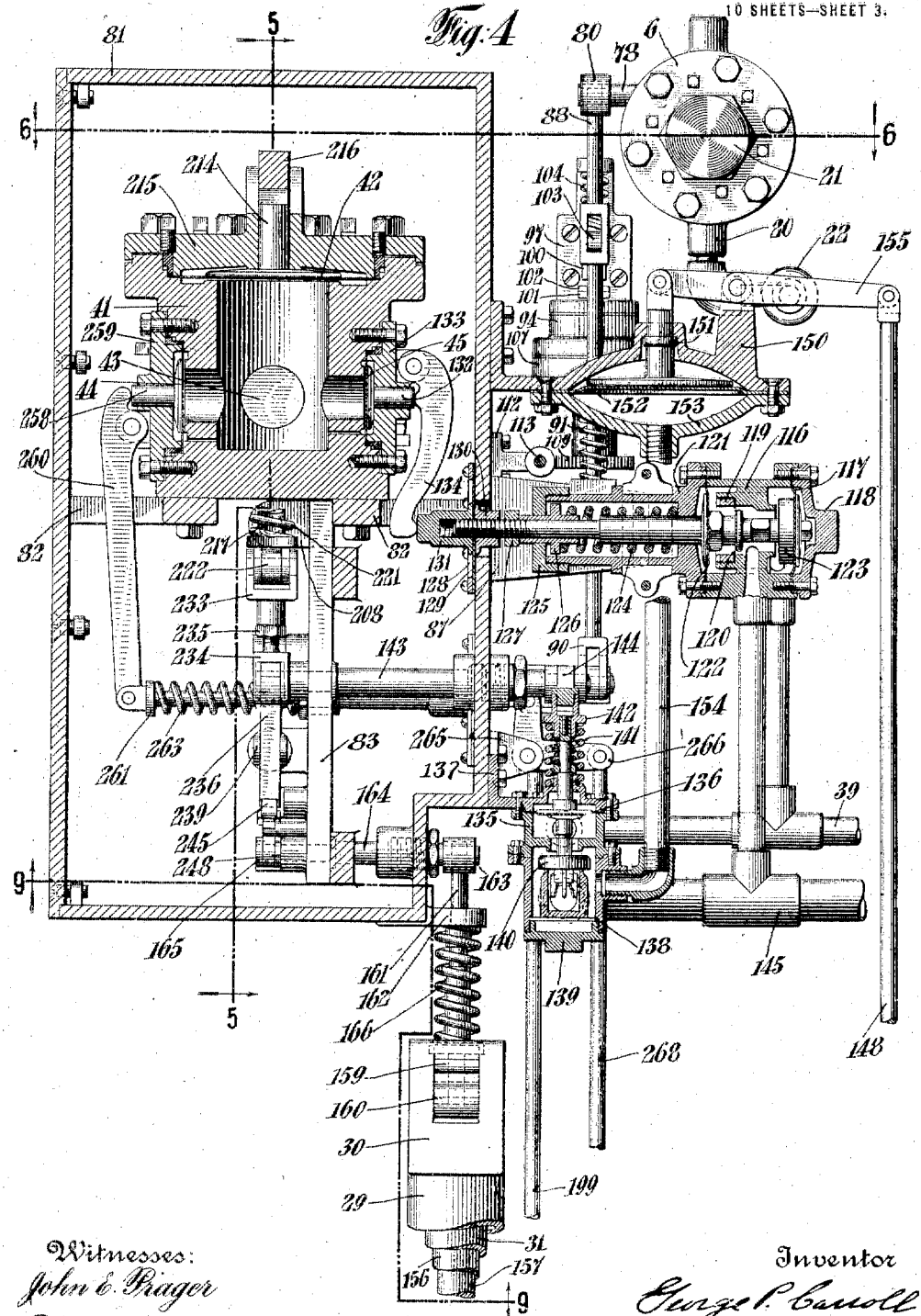

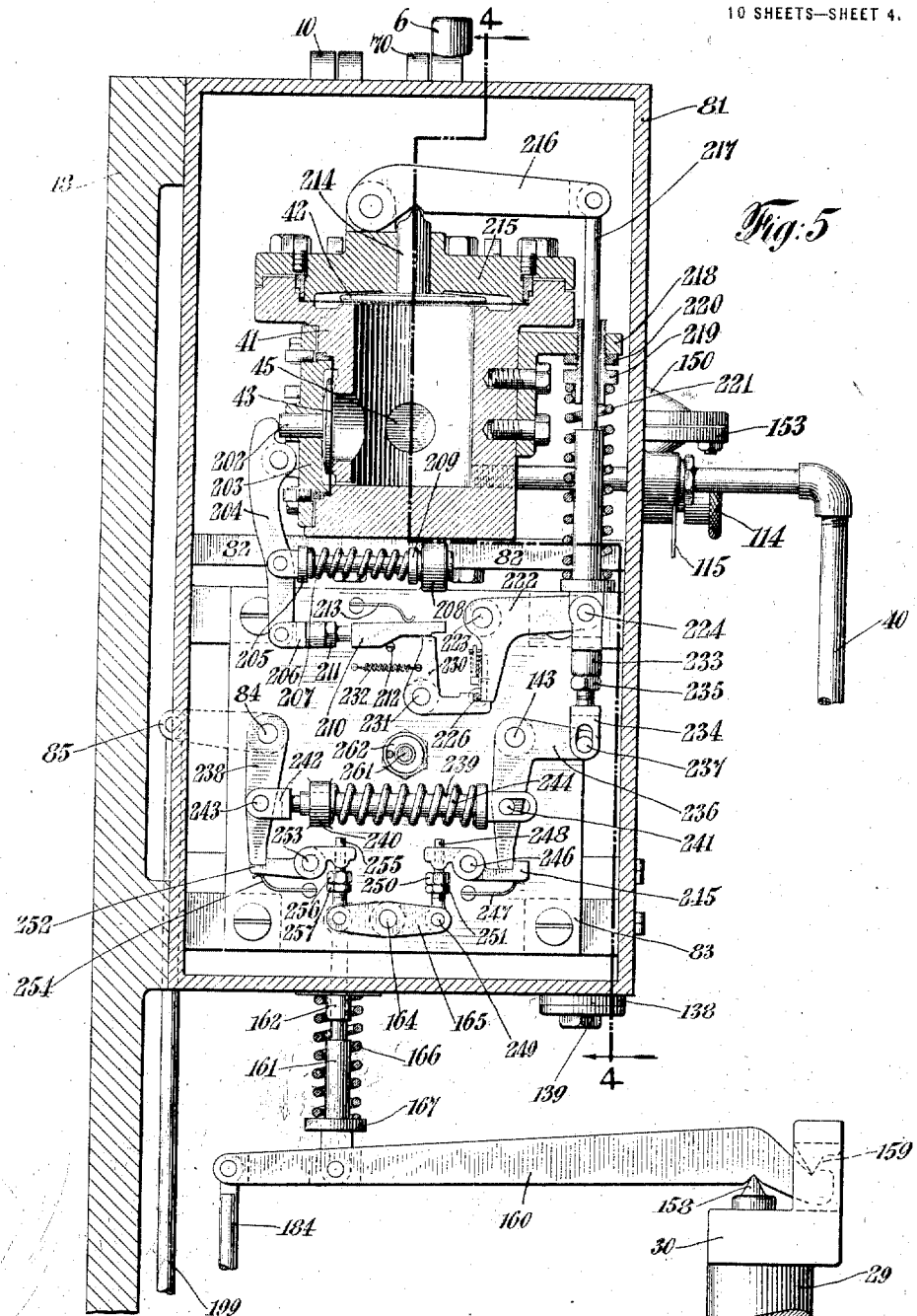

G. P. CARROLL.
REFRIGERATING MACHINE.
APPLICATION FILED JAN. 18, 1915.
1,217,084.
Patented Feb. 20, 1917.
10 SHEETS—SHEET 5.
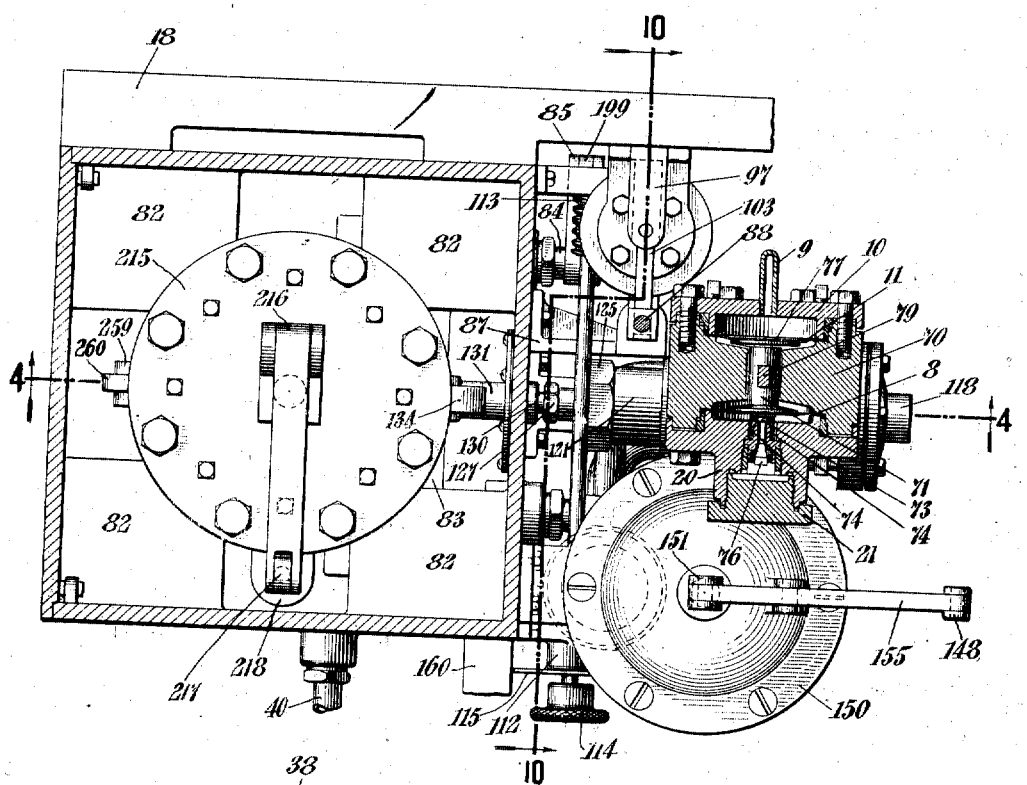
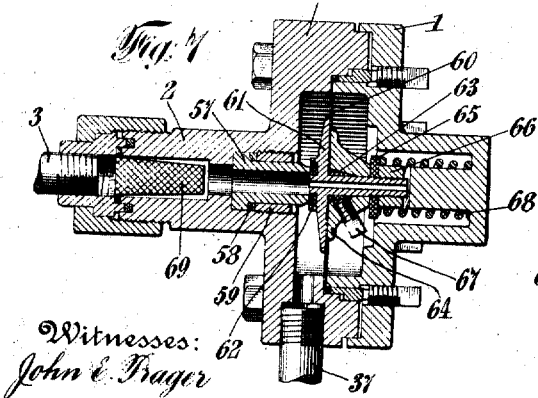
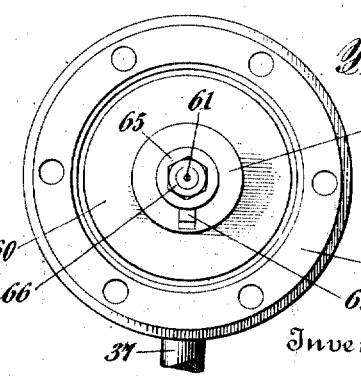
Witnesses:
John E. Frager
A. Worden Gibbs
Inventor
George P. Carroll

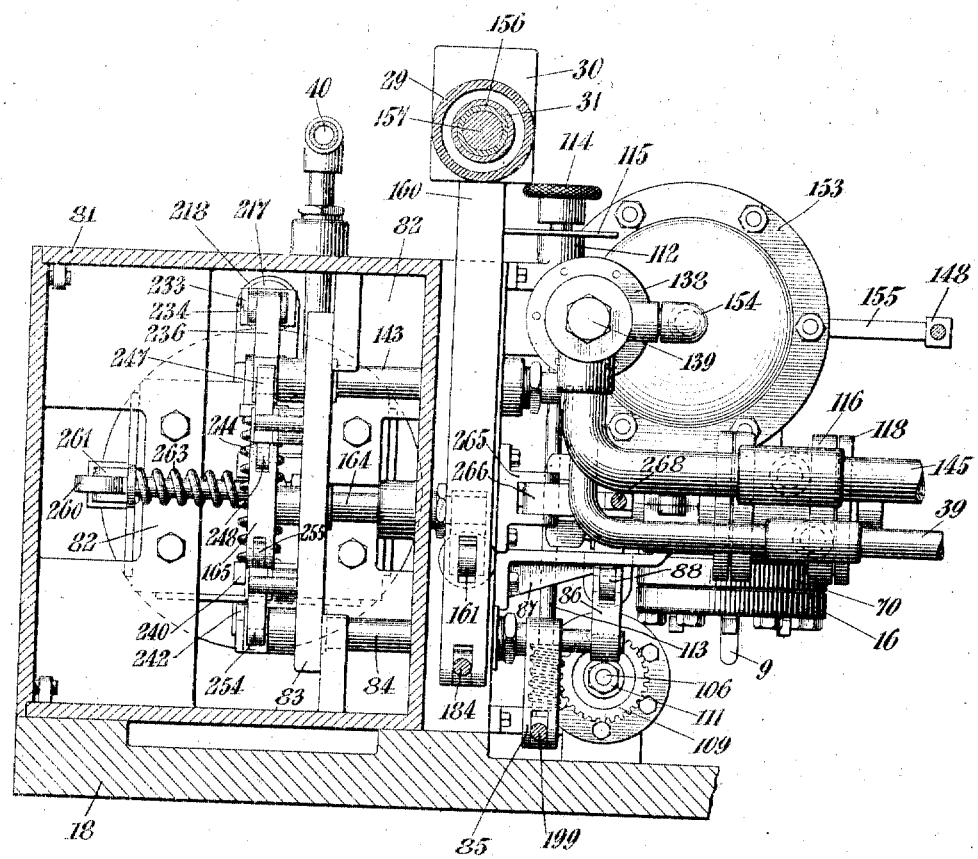

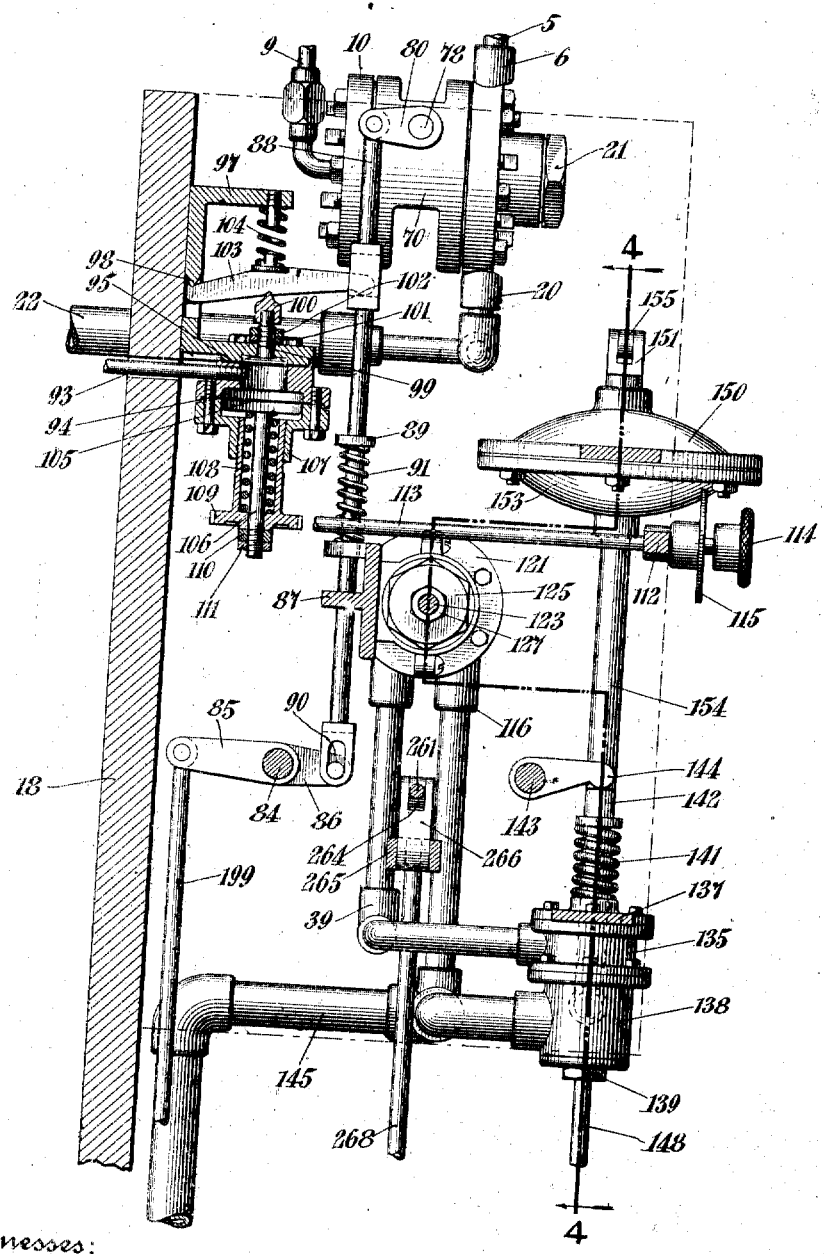

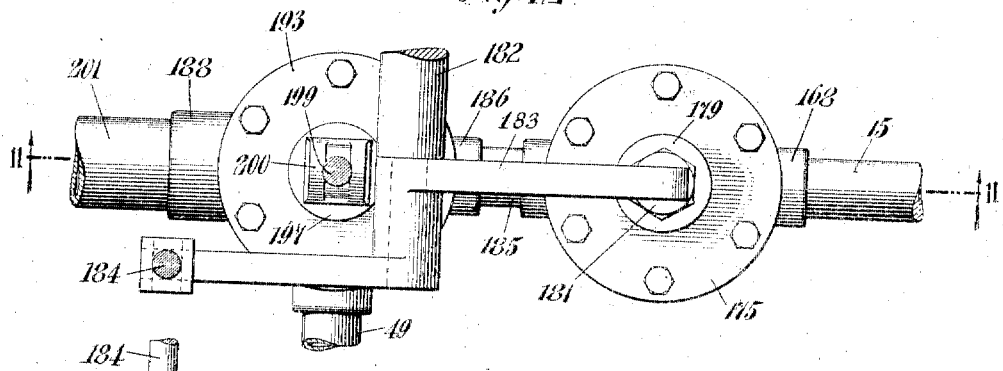
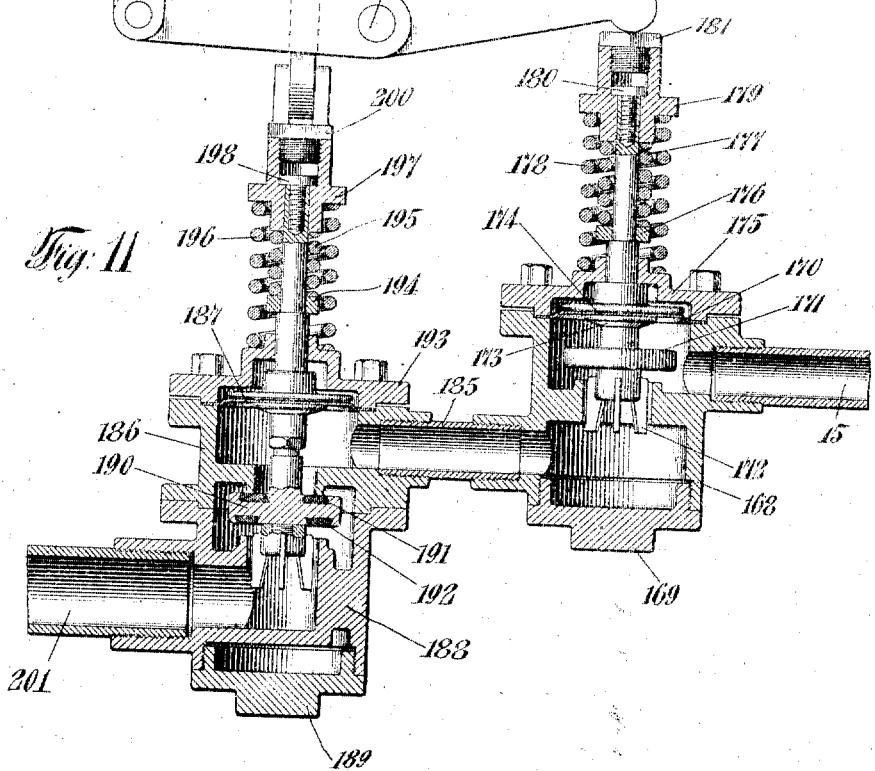

G. P. CARROLL.
REFRIGERATING MACHINE.
APPLICATION FILED JAN. 18, 1915.
1,217,084.
Patented Feb. 20, 1917.
10 SHEETS—SHEET 9.
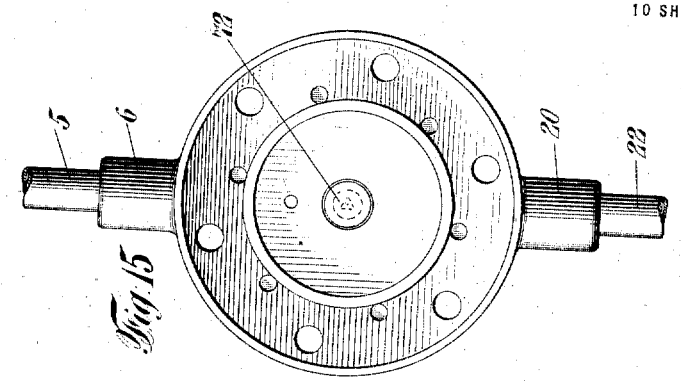
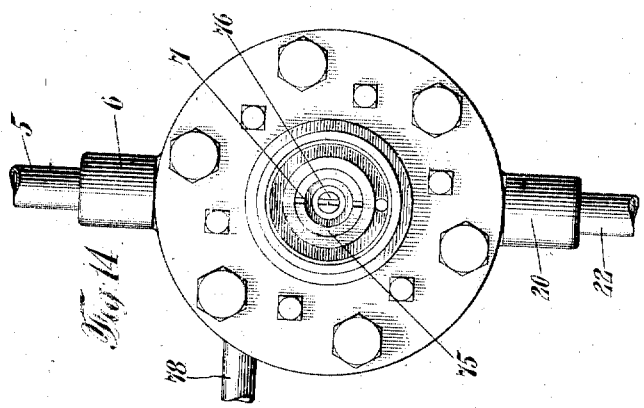
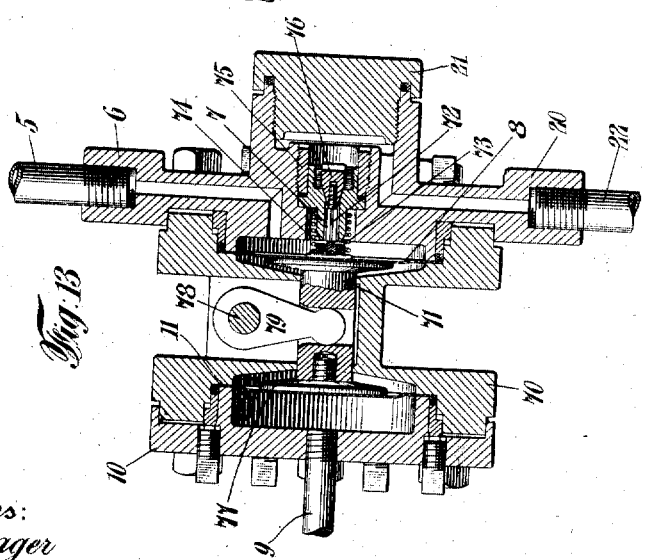
Witnesses:
John E. Frager
A. Worden Gibbs
Inventor
George P. Carroll

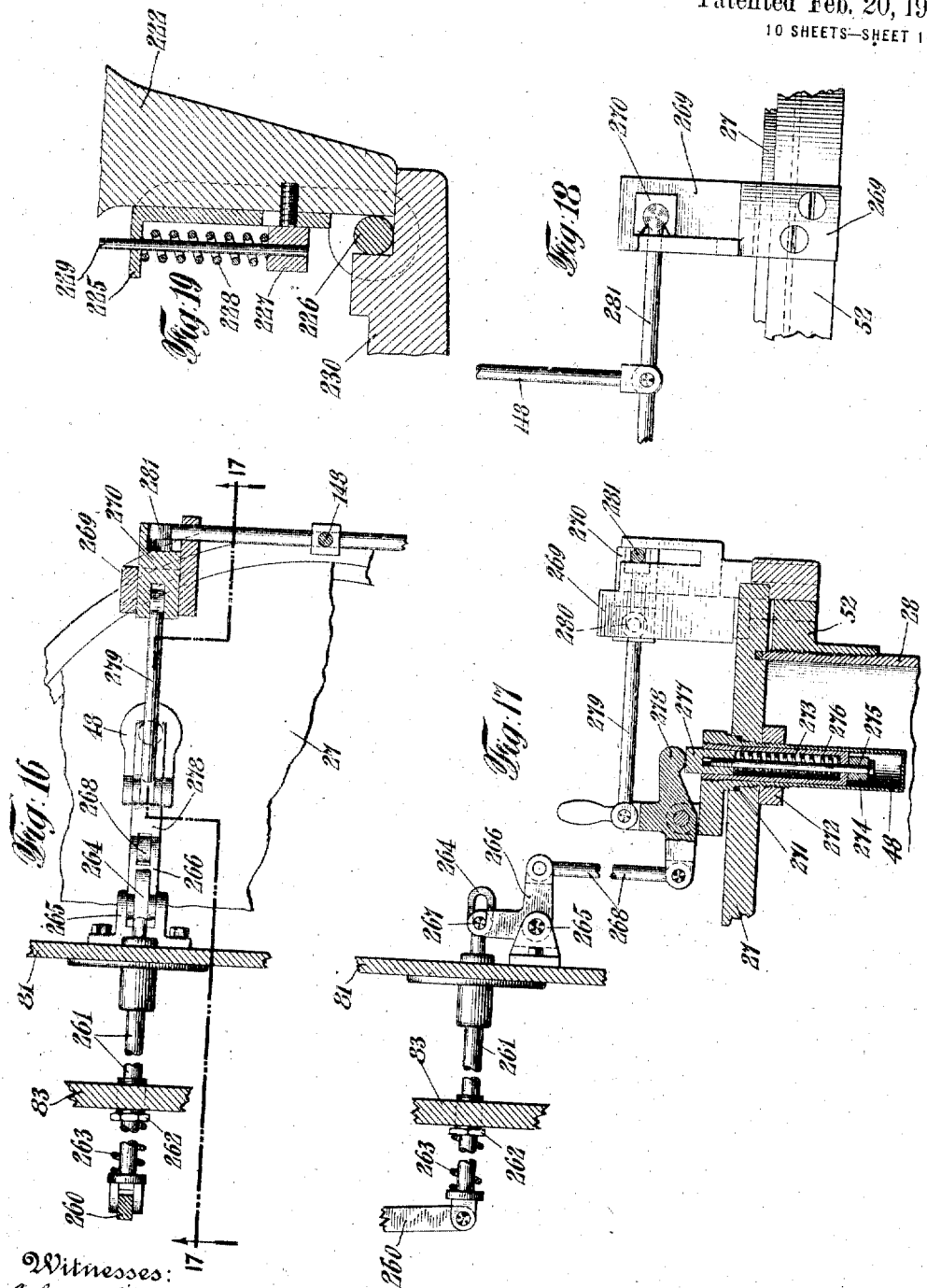

UNITED STATES PATENT OFFICE.

GEORGE P. CARROLL, OF HARTFORD, CONNECTICUT.

REFRIGERATING MACHINE.

1,217,084.  Specification of Letters Patent.  Patented Feb. 20, 1917.

Application filed January 18, 1915. Serial No. 2,865.

*To all whom it may concern:*

Be it known that I, GEORGE P. CARROLL, a citizen of the United States, residing at Hartford, in the county of Hartford and State of Connecticut, have invented a new and useful Refrigerating-Machine, of which the following is a specification.

My invention relates to improvements in refrigerating machines of the absorption type and is intended to so improve such machines that they will be automatic, safe and economical of operation, both of the heating agent for the still and of the cooling water for the still and the condenser, especially when of small capacity and when used in connection with domestic refrigerators, soda water fountains and similar structures where refrigeration, with or without ice making, is desired and the attendance of an engineer is impracticable. The means employed for accomplishing these purposes are disclosed in the accompanying drawings and in the description relating thereto. There are certain detail improvements in construction that will also so appear.

As in all such apparatus of the absorption type, the machine is constructed to contain and use one substance as a refrigerant and another substance as the absorbent of the refrigerant. While other materials may be employed, I prefer to use ammonia as the refrigerant and water as the absorbent; and, as these substances are most commonly used in absorption systems, they will be referred to in the description as typical of all. While, as herein shown, gas is employed as the heating agent, it is to be understood that the still may be heated by any other suitable means, as by an electric heater, as illustrated in the patent to me, No. 978,557, dated Dec. 13, 1910. The size of the machine, as shown in the drawings, is much exaggerated in proportion to the size of the compartment to be refrigerated, commonly called the refrigerator.

In the following items, among others, this application is a continuation of certain matters disclosed in, and has the same filing date as, my like entitled application Ser. No. 424,517, filed Apr. 1, 1908: first, means for utilizing temperature and pressure conditions in the place to be refrigerated and in the conduit for the circulation of the refrigerant to control the heating of the still and the cooling of the condenser and of the still and to maintain a predetermined temperature in said place; second, means for utilizing temperature and pressure conditions in the place to be refrigerated and in the still itself to control the heating of the still and the cooling of the condenser and of the still and to maintain a predetermined temperature in said place; third, means controlled by the pressure in the apparatus operative to draw expanded refrigerant from the evaporator and to expel it into the condenser (or, more narrowly speaking, by the pressure in the still) to permit a flow of cooling water to the condenser when such pressure exceeds a predetermined limit (there being a valve controlling a cooling water passage of the condenser and means operating in case of such excess pressure to open the valve and to keep it open to an extent corresponding to the variations of such pressure when above such limit); fourth, means automatically operative at intervals to make inoperative the mechanism regulating the flow of refrigerant from the condenser into the evaporator, its expansion within the evaporator and its absorption in the still and to heat the still, means terminating the heating of the still when the absorbent and the absorbed refrigerant therewith have been reduced to a predetermined weakness, and means thereafter (upon the cooling down of the still to a predetermined limit) permitting said mechanism to operate; fifth, the inclusion of a (double pipe) dehydrator between the condenser casing and the outlet end of the main part of the apparatus operative to draw expanded refrigerant from the evaporator and to expel it through the outlet end, the gas conduit of the dehydrator leading upward for a distance and then descending into the casing and the casing having a cooling water passage (with the inlet below the outlet) in series with the inner or water conduit of the dehydrator (with a check valve interposed in the dehydrator above its section containing the inner pipe); sixth, means automatically operative at intervals to open the feed valve at the inlet end of the evaporator and the water valve controlling the cooling water passage of the still in a predetermined relation to each other (or, more narrowly speaking, simultaneously) and to close the valves in a predetermined relation to each other (or, more narrowly speaking, simultaneously) and means automatically operative for heating at intervals the still to a predetermined limit while the valves are closed; and seventh, a thermostat at a low temperature limit controlled by the temperature about the evaporator and controlling the feed valve at the inlet end of the evaporator, means permitting a flow of cooling water to the still in its absorption period and means operative for heating at intervals the still to a predetermined limit.

In the following items, among others, this application is a continuation of certain matters disclosed in, and has the same filing date as, my like entitled application Ser. No. 595,453, filed Dec. 3, 1910: first, means responsive to a change in conditions in the still for automatically discontinuing the heating of the still and means responsive to a change in conditions in the still for automatically discontinuing the cooling of the still; second, means automatically terminating the heating of the still when the absorbent therein has been reduced to a predetermined state of weakness and means automatically terminating the cooling of the still when the absorbent therein has reached a predetermined state of saturation; third, means automatically operative to start the heating of the still after the state of saturation indicated in said second item has been reached; fourth, means responsive to a change in conditions in the circuit consisting of the still, the condenser and the evaporator to control the means for heating the still and means responsive to a change in conditions in said circuit for controlling the means for cooling the still; fifth, mechanism adapted to regulate the expansion of refrigerant from the condenser of the circuit indicated in said fourth item into the evaporator so indicated and the absorption of such refrigerant into the still so indicated; sixth, means for utilizing temperature and pressure conditions in the conduit for the circulation of refrigerant to control the heating of the still and the cooling of the condenser and of the still; seventh, means for utilizing temperature and pressure conditions in the conduit for the circulation of refrigerant to control the heating of the still and the cooling of the condenser and of the still, to close the feed valve at the inlet end of the evaporator simultaneously with such heating and to permit of it thereafter being open; eighth, the same as the first item specified in the last preceding paragraph; ninth, the same as the fourth item specified in the last preceding paragraph; tenth, means preventing the starting of the heating of the still until certain refrigerant regulating mechanism is so acted upon as to prevent a flow of refrigerant into the still and a flow of cooling water to the still is prevented; eleventh, means preventing the mechanism indicated in said tenth item from permitting a flow of refrigerant into the still and preventing a flow of cooling water to the still until after the termination of the heating of the still; twelfth, a safety device operating to stop the heating of the still before its normal termination in case the pressure in the still rises above a normal limit; and thirteenth, dominating means for heating at intervals the still and refrigerant regulative means temperature controlled in the period between the operations of the dominating means and then operative to regulate the flow of refrigerant from the condenser into the evaporator and its absorption in the still so as to maintain a predetermined temperature in the place to be refrigerated, the dominating means during such heating also causing the regulative means to be inoperative.

In the following items, among others, this application is a continuation of certain matters disclosed in, and has the same filing date as, my like entitled application Ser. No. 748,589, filed Feb. 15, 1913: first to eighth inclusive, the same as the first eight items specified in the last preceding paragraph; ninth, means for utilizing temperature and pressure conditions in the conduit for the circulation of refrigerant to control the heating of the still and the cooling of the condenser and of the still, to close a feed valve at the inlet end of the evaporator simultaneously with such heating and to permit of it thereafter being open and a thermostat controlled by the temperature in the place to be refrigerated and regulating the valve in the intervals between such heatings; tenth, means for utilizing temperature and pressure conditions in the still to control the heating of the still and the cooling of the condenser and of the still; eleventh, means for utilizing temperature and pressure conditions in the still to control the heating of the still and the cooling of the condenser and of the still, to close a feed valve at the inlet end of the evaporator simultaneously with such heating and to permit of it thereafter being open; twelfth, the same as the second item specified in the second preceding paragraph; thirteenth, means for utilizing temperature and pressure conditions in the still to control the heating of the still and the cooling of the condenser and of the still, to close a feed valve at the inlet end of the evaporator simultaneously with such heating and to permit of it thereafter being open and a thermostat controlled by the temperature in the place to be refrigerated and regulating the valve in the intervals between such heatings; fourteenth, the same as the third item specified in the second preceding paragraph, except that the means regulating the flow of cooling water to the condenser do not graduate such flow during the continuance of the flow; fifteenth, the same as the fourth item specified in the second preceding paragraph; sixteenth, the same as the tenth item specified in the last preceding paragraph; seventeenth, means preventing the starting of the heating of the still until the feed valve at the inlet end of the evaporator is closed and until a flow of cooling water to the still is prevented; eighteenth, the same as the eleventh item specified in the last preceding paragraph; nineteenth, means preventing the opening of the feed valve indicated in said seventeenth item and a flow of cooling water to the still until after the termination of the heating of the still; twentieth, the same as the fifth item specified in the second preceding paragraph, except as to the location of the check valve; twenty-first, the same as the sixth item specified in the second preceding paragraph; twenty-second, the same as the seventh item specified in the second preceding paragraph; twenty-third, the same as the twelfth item specified in the last preceding paragraph; twenty-fourth, means for cooling the absorbent in the still in its absorption period to a predetermining limit, means terminating the absorption period when the pressure of absorbed refrigerant rises to a predetermined limit and means thereafter operative to heat the still; twenty-fifth, means for regulating the flow of refrigerant from the condenser into the evaporator, its expansion within the evaporator and its absorption in the still, means terminating the absorption period when the pressure of absorbed refrigerant in the still rises to a predetermined limit and means thereafter operative to heat the still to a predetermined limit and subsequently to start the operation of the regulating means; twenty-sixth, the same as the thirteenth item specified in the last preceding paragraph; and twenty-seventh, mechanism controlled by the temperature in the still in its absorption period and permitting in such period a flow of water through the cooling water passage of the still (sufficient to maintain a predetermined coolness in the still).

In the following items, among others, this application is a continuation of certain matters disclosed in, and has the same filing date as, my like entitled application Ser. No. 794,583, filed Oct. 11, 1913: first, the same as the third item specified in the third preceding paragraph; second, the same as the tenth item specified in the second preceding paragraph; third, the same as the seventeenth item specified in the last preceding paragraph; fourth, the same as the eleventh item specified in the second preceding paragraph; fifth, the same as the nineteenth item specified in the last preceding paragraph; sixth, the same as the twentieth item specified in the last preceding paragraph; and seventh, the same as the twelfth item specified in the second preceding paragraph.

Figure 2:
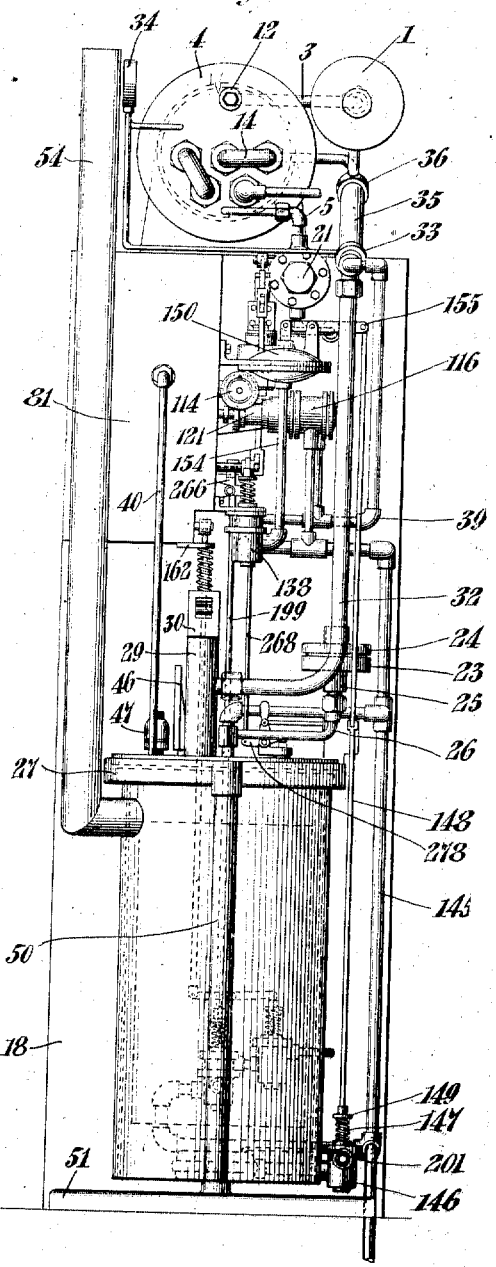

In the drawings, Figure 1 is a front elevation of my invention, with, however, certain parts shown in vertical section or broken away, exhibited in connection with an ordinary refrigerator from which the front has been removed. Fig. 2 is a right end elevation of the structure of the preceding figure. Fig. 3 is a partial left end elevation of the structure of Fig. 1 and a partial vertical section thereof through the line 3—3, looking toward the right. Fig. 4 is an enlarged partial right end elevation and partial vertical section of certain controlling mechanism shown in the preceding figures, with, however, some parts broken away, as seen through the lines 4—4 of Figs. 5 and 10, looking toward the lift, and through the line 4—4 of Fig. 6, looking upward. Fig. 5 is a partial front elevation of the structure of Fig. 4 and a partial vertical section thereof, as seen through the line 5—5 of Fig. 4, looking toward the right. Fig. 6 is a partial plan view of the same controlling mechanism and a partial horizontal section thereof through the line 6—6 of Fig. 4, looking downward. Fig. 7 is an enlarged vertical section of a check valve structure, with certain parts in elevation. Fig. 8 is a right end elevation of a part of the structure of the preceding figure, a cover and certain other parts being removed. Fig. 9 is a partial view from beneath of the same controlling mechanism and a partial horizontal section thereof through the line 9—9 of Fig. 4, looking upward. Fig. 10 is a partial front elevation of the same controlling mechanism and a partial vertical section thereof through the line 10—10 of Fig. 6, looking toward the right. Fig. 11 is an enlarged partial vertical section and partial right end elevation of two valve structures controlling the supply of cooling water to the still. Fig. 12 is a plan view of the structure of the preceding figure. Fig. 13 is an enlarged partial vertical section and partial front elevation of an expansion valve structure. Fig. 14 is a right end elevation of the same structure with a cap removed. Fig. 15 is a left end elevation of that part of the same structure that contains the fluid passages. Fig. 16 is an enlarged partial plan view and partial horizontal section of a high pressure safety device and its connected parts. Fig. 17 is a partial right end elevation and a partial vertical section of the structure of the preceding figure through the line 17—17 thereof, looking upward. Fig. 18 is a rear elevation of part of the same structure. Fig. 19 is an enlarged vertical section of an anti-friction roller device.

A flanged cover casing 1 is secured to the flanged part 38 of a valve casing, having a horizontal passage through its stem part 2. From the left termination of the stem part 2 a gas pipe 3 leads horizontally through the upper part of the left head of a horizontal, cylindrical condenser tank 4. From the lowest part of the right head of the tank 4 a small pipe 5 leads downward into the inlet end 6 of a fluid passage casing containing a two-surface valve seat piece 7, as shown in Fig. 13. A diaphragm 8 closes the left end of this casing. From the under side of the tank 4 a small pipe 9 leads through a cover casing 10. A diaphragm 11 closes the right side of this casing. The diaphragms 8 and 11, and also all the other diaphragms with which the ammonia comes in contact, are preferably of very thin vanadium steel. A purge valve 12 and a condenser gage 13 severally connect with the tank 4 through its right head. Grouped in the lower half of the tank 4 and extending through its heads, are five horizontal, parallel pipes, with their ends connected in series by return bends, so as to form a water conduit 14, leading from the lower back part of the right end of the tank and emerging from the back central part of its left end. A pipe 15, provided with a hand valve 16, leads from a source of cooling water and has one branch leading into the inlet end of the conduit 14 and another branch leading downward. The parts 1 to 14 inclusive constitute one form of condenser. A construction essentially the same as that exhibited in these parts and in the parts 33 to 39 inclusive, to be described, is set forth and claimed in my application Ser. No. 799,094, filed Nov. 4, 1913, entitled Condenser.

Bands 17 secure the tank 4 to the top of a refrigerator 18, containing a brine tank 19 in its upper part. From the outlet end 20 of the casing containing the piece 7, and closed on the right side by a cap 21, a pipe 22 enters the right upper part of the refrigerator 18, coils downward in the space above the tank 19 and then in the tank, so as to form a descending coil, and, emerging through the right side walls of the tank and of the refrigerator, leads horizontally into the flanged part 23 of a valve casing, having a vertical passage through its stem part 25. A flanged cover casing 24 is secured to the flanged part 23. The parts 20 to 23 inclusive constitute one form of evaporator.

From the lower termination of the stem part 25, a pipe 26 leads downward through the head 27 of a vertical tank 28 and terminates in a flaring end near the bottom wall of the tank. Projecting upward from an opening through the head 27, toward its right edge, is a stout vertical pipe 29, closed at the top by the base of an angle head 30. Open at the top and closed at its lower end, a pipe 31 passes through the base of the head 30, extends downward into the tank 28 substantially as far as the lower termination of the pipe 26 and in its upper part is within and axially coincident with the pipe 29, but is spaced away therefrom, as shown in Figs. 4, 5 and 9. From the side of the pipe 29, a pipe 32 extends backward and then upward into the under side of an angle casing 33, in a line substantially in the same plane as the top of the refrigerator 18. A still gage 34 connects with the upper side of the casing 33. From the upwardly inclined left end of the casing 33, a pipe 35, much larger than the pipe 32, inclines upward and enters the inclined lower end of an angle casing 36. From the upper side of the casing 36 a short gas pipe 37 leads upward into the flanged part 38. A pipe 39 leads from the outlet end of the conduit 14, passes longitudinally through the casing 36, the pipe 35 and the casing 33, so as to be axially coincident therewith, but spaced away from the side walls thereof, emerges through the lower end wall of the casing 33, passes downward and terminates in an upward branch and a horizontal branch. Thus there is a free passage for gas from the tank 28 through the annular space between the pipes 31 and 29, through the pipe 32, through the annular space between the pipe 39 and the parts 33, 35 and 36, and through the pipe 37 into the flanged part 38.

From an opening through the head 27, a pressure transmitting pipe 40 leads upward and then horizontally into a pressure box 41. A diaphragm 42 closes an opening in the top of the box 40; a diaphragm 43 closes an opening in its left side; a diaphragm 44 closes an opening in its front; and a diaphragm 45 closes an opening in its back. A thermometer 46 has a stem extending through the head 27 far down into the tank 28. A purge valve 47 connects with the tank 28 through an opening in the head 27. A stout tube 48, closed at its lower end, being part of a safety device to be described, extends through the head 27 into the tank 28. A water pipe 49 enters the left wall of the tank 28 near its lower end, coils upward therein for about half of its height and passes upward and out through the head 27. The parts 24 to 49 inclusive constitute one form of still.

The left end of the head 27 is secured to the side of the refrigerator 18 and its right edge is supported by a stout rod 50, resting on a base 51, also secured to the refrigerator. As shown in Fig. 17, a collar 52 is screwed around the threaded top of the tank 28; the head 27 has a groove containing a lead gasket, fitting over and around the top edge of the tank; and then the head and the collar are bolted together in the usual manner so as to compress the gasket. From the lower edge of the collar 52, a heat retaining cylinder 53 extends downward to a short distance above the base 51, being spaced away a little from the tank 28. A flue 54 is shown as extending upward from an opening at the top of the cylinder 53. But in a small machine it is better to omit the flue 54 and to provide a plurality of openings around the top of the cylinder 53. Upon the base 51 and under the tank 28, are a pilot burner 55 and a main burner 56, constituting one form of means for heating the still at intervals.

Considering Figs. 7 and 8, an annular valve seat piece 57, slightly flanged at its left end and having the seat at the right, is positioned in the enlarged right end of the passage through the part 2. A gasket 58, preferably of lead, surrounds the piece 57 next to its flange. An externally threaded slotted ring 59 is screwed into the correspondingly threaded right end of the passage through the part 2 until it compresses the gasket 58, thus making a gas tight joint. Between the flanges of the casings 1 and 38 is clamped the edge of a diaphragm 60, perforated at its center. The means indicated for securing the edge of a diaphragm between two casings, with an adjacent lead gasket to make a tight joint, as shown here and elsewhere in the drawings, are set forth in the patent issued to me on the application of Roehrich, No. 1,097,595, dated May 19, 1914. A flanged carrier 61 has its flange close to the left side of the diaphragm 60; it has a stem, externally threaded at its extreme right end, extending through the perforation of the diaphragm; it has a small passage at its axial center, extending from end to end; and it has an annular groove, concentric with this passage, containing a ring 62, preferably of tin, adapted for seating on the seat of the piece 57. A wedge shaped ring 63, preferably of lead, surrounds the stem of the carrier 61 to the right of and close to the diaphragm 60. Outside of the ring 63, an annular container 64 bears against the right side of the diaphragm 60 and the stem of the carrier 61, so as to entirely inclose the ring. A collar 65 surrounds the stem of the carrier 61 to the right of the container 64. A nut 66 is screwed around the extreme right end of the stem of the carrier 61 so as to press the collar 65 and the container 64 as far as possible to the left. A headed screw 67 is screwed through a correspondingly threaded opening in the slanting exterior surface of the container 64 so as to press upon and into the slightly plastic mass of the ring 63, with the effect of making a gas tight joint between the stem of the carrier 61 and the diaphragm 60 at the perforation of the latter. A spiral spring 68, surrounding the nut 66 and a projecting part of the right inner wall of the casing 1, bears at its left end against the collar 65 and at its right end against the wall of the casing. The parts 60 to 68 inclusive, constitute one form of check valve. The thrust of the spring 68 is preferably such that the valve seats itself upon the piece 57 unless the pressure in the flanged part 38 exceeds the pressure in the casing 1 by about two or three pounds. A wire gauze strainer 69, in the left end of the passage through the stem part 2, prevents any dirt from being carried backward to clog the valve. The connection between the left end of the stem part 2 and the right end of the pipe 3 is made by means well known in the art.

The construction of the parts 57 to 68 is such that the pressure of fluid in the stem part 2 is transmitted through the passage of the carrier 61 in such manner as to bear upon the right of the check valve when closed. The greater such pressure becomes, the more tightly is the valve closed. When, however, the pressure in the flanged part 38, entering by the pipe 37, exceeds, by about two or three pounds, the pressure in the stem part 2 and the casing 1, the force exerted on the left side of the valve causes it to open. And when, finally, the pressure of fluid in the flanged part 38 drops so as to be below that of the fluid in the stem part 2 and the casing 1, by about two or three pounds, the valve closes. These parts constitute one form of means for preventing a back flow of refrigerant from the condenser into the still. Similar mechanism within the parts 23, 24 and 25 constitute one form of means for preventing a back flow of refrigerant from the still into the evaporator.

A central casing 70, especially shown in Figs. 13, 10 and 6, has opposed flanges at opposite ends; it has an axially central opening through the flanges; and it has two web connections between the flanges, with shaft openings from front to back through the connections. A carrier 71 is adapted to reciprocate slightly in the opening through the casing 70; it has a central vertical slot; and it has at its right end a flange bearing against the left side of the diaphragm 8. A valve 72 has a flange adjacent to the right side of the diaphragm 8; it has a disk part, preferably containing a tin ring 73, in its right surface; it is adapted, at its ring 73, for closing the left valve seat of the piece 7; it has a stem extending to the right, with three longitudinal ribs on its main part; and it is threaded at the right end of its stem. The piece 7 has at its left end a knife edge seat; it has at its right end a conical seat; and it has a passage between the seats large enough for the ribbed part of the valve 72 to reciprocate freely therein. A spiral spring 74 surrounds the disk part of the valve 72 and the left end of the piece 7 and bears at its left end against the flange of the valve and at its right end against the enlarged right end of the piece. The piece 7 is secured, in an enlarged part of the passage between the ends 6 and 20, by a gasket and slotted ring 75, in the same manner as has been described in reference to Fig. 7. A conical valve end 76 is screwed around the right end of the valve 72 so as to be adapted to close the conical seat of the piece 7. The parts are so spaced that, when the ring 73 closes its seat, the valve end 76 is entirely lifted from its seat; and when the valve end closes its seat, the ring is entirely lifted from its seat; but when the valve end simply throttles the passage through its seat, the ring is more or less lifted from its seat. The spring 74 tends to seat the valve end 76 and to unseat the ring 73. A flange 77 is screwed, by means of a screw projection, into a threaded opening at the left end of the carrier 71 and is adjacent to the right side of the diaphragm 11. The casing having the parts 72, 73, 74, 75 and 76 properly in place, is secured to the right flange of the casing 70, containing the parts 71 and 77 properly in place, so as to clamp the edge of the diaphragm 8; and the casing 10 is secured to the left flange of the casing 70, so as to clamp the edge of the diaphragm 11. The parts 72, 73 and 76 constitute one form of feed or expansion valve. The exposed area on the left of the diaphragm 11, and subject to the pressure of fluid transmitted through the pipe 9, is equal to the area on the right of the diaphragm 8 exposed to the pressure of fluid entering the inlet end 36 through the pipe 5. Consequently the expansion valve is balanced so as to be unaffected by variations of pressure in the condenser. Wherever a needle valve, similar to the valve end 76, is used both to throttle and also to stop the flow of vaporizing ammonia, after a time a groove or hollow develops in the surface of the valve—probably due to the high velocity of the expanding fluid particles—so that such a valve can no longer be closed tight. But in my construction the ring 73 is the part of the expansion valve that serves as a stop valve, and, as it is positioned in advance of the point where the liquid ammonia begins to vaporize, it is not subjected to the peculiar wearing effect just indicated. On the other hand, such a wearing of the valve end 76 is of slight consequence, since that is intended to serve merely as the throttling part of the valve— as will be presently explained.

A rock shaft 78 has its bearings in the openings through the web connections of the casing 70 and, between the connections, carries an inner lever 79, extending downward into the vertical slot of the carrier 71. To the projecting front end of the shaft 78 is secured an outer lever 80, extending toward the left. A rectangular casing 81 is secured to the right side of the refrigerator 18, with its upper surface in line with the top of the refrigerator; and it contains and, by means of brackets 82, supports the box 41. Below the box 41 and within the casing 81, is a vertical plate 83, extending from left to right, as best seen in Figs. 5 and 4, and supported by brackets. A rock shaft 84 is journaled in the plate 83 and in the back wall of the casing 81. To the rear end of the shaft 84, outside of the casing 81, are secured a lever 85 extending to the left and a shorter lever 86 extending to the right and forked at its free end. Above the free end of the lever 86 is a bracket 87, secured to the back wall of the casing 81 and with a vertical guide opening through it. A connecting rod 88 is pivoted at the top to the left end of the lever 80; it has, a short distance from the top, a squared enlargement with a transverse slot therein; it has, below the enlargement, a longitudinally adjustable collar 89; it passes through the opening of the bracket 87; and it has at its lower end an oblong slot. A pin 90 is secured at its ends in openings through the forks of the lever 86 and at its center is within the oblong slot of the rod 88. A spiral spring 91 surrounds the rod 88 and at opposite ends bears against the upper side of the bracket 87 and the under side of the collar 89.

The construction of the parts 78 to 91 inclusive is such that, on a counter-clockwise turning of the shaft 84 and of the lever 86, the rod 88, in so far as concerns the pin 90, is free to remain in its low position, as shown, or to be moved upward as far as its slot will permit; but the spring 91 then tends to move the collar 89 and the rod 88 upward and to turn clockwise the lever 80, the shaft 78 and the lever 79. Any such clockwise turning of the lever 79 moves the parts 71, 77 and 11 to the left, so that the spring 74 moves the valve 72 and the diaphragm 8 to the left and more or less unseats the ring 73 and to the same degree more or less seats the valve end 76. Upon a subsequent clockwise turning of the shaft 84 and of the lever 86, the pin 90 pulls downward the rod 88 and the collar 89; the collar compresses the spring 91; the rod 88 turns counter-clockwise the lever 80, the shaft 78 and the lever 79. Such counter-clockwise turning of the lever 79 moves the parts 77, 71, 72, 73 and 76 to the right, so that the pressure upon the diaphragm 11 forces it to the right and the valve 72 compresses the spring 74 and seats the ring 73 and unseats the valve end 76. It is also obvious that upon a counter-clockwise turning of the shaft 84 and the lever 86, by reason of the oblong slot of the rod 88, the rod may be so acted upon as to leave the expansion valve in an intermediate open position, that is to say with the ring 73 and the valve end 76 both unseated.

At the right side of the refrigerator 18, below the tank 19, is a vertical cylinder 92, containing some expansive liquid, preferably alcohol, that does not freeze at temperatures above zero Fahrenheit. From the cylinder 92, a small pipe 93 extends upward and through the side wall of the refrigerator 18 into a casing 94, as shown in Fig. 10, closed on top by a motor diaphragm 95. A bracket 97, secured to the right side of the refrigerator 18, has at the top a horizontal arm with a pin projecting downward from the end; it has a slot in its part adjacent to the refrigerator with a knife edge pivot 98 at the top of the slot; and it has at its lower end a projecting horizontal plate, with an opening through it in axial alinement with the pin. A flanged member 99 has a stem projecting upward through the opening in the plate of the bracket 97 and has its flange adjacent to the outside of the diaphragm 95. A knife edge bearing 100 is secured to the top of the member 99. A nut 101 and a lock nut 102 are screwed upon the threaded stem of the member 99 just above the plate of the bracket 97 and serve to limit the downward movement of the member. The plate of the bracket 97 and the casing 94 are bolted together so as to clamp the edge of the diaphragm 95. A lever 103 has at its upper left end a transverse angular groove engaging with the pivot 98; it has on its under side a transverse angular groove engaging with the bearing 100; it has on top, immediately over the last mentioned groove, a small disk with a pin projecting upward therefrom; and it has its right end within the transverse slot of the rod 88. A spiral spring 104, stronger than the springs 91 and 74, at the top bears upon the under side of the arm of the bracket 97 and surrounds its pin and at the bottom bears upon the disk of the lever 103 and surrounds its pin. The maximum upturn of the lever 103, and consequently the maximum distending upward of the diaphragm 95 and the maximum compression of the spring 104, are determined by the contact of the right end of the lever with the top of the slot of the rod 88. A relief diaphragm 105, much larger than the diaphragm 95, closes the under side of the casing 104. The diaphragms 95 and 105 are preferably of phosphor bronze. A flanged rod 106 has its flange adjacent to the under side of the diaphragm 105. Bolted to the under side of the casing 94 so as to clamp the diaphragm 105 and to contain the flange of the rod 106, is a cover casing 107 with an internally threaded opening through its under side. A spiral spring 108, much stronger than the spring 104, surrounds the rod 106 and bears against the under side of its flange. A cylinder 109, threaded at the top, is screwed into the opening of the casing 107; it surrounds the rod 106 near its lower end; it bears upon the lower end of the spring 108; and at the lower end it has a toothed flange. A nut 110 and a lock nut 111 are screwed upon the threaded lower end of the rod 106 below the cylinder 109 and serve to limit the upward movement of the rod. Journaled in a bracket 112 bolted to the back of the casing 81, is an adjusting stem 113, having at its left end a worm engaging with the teeth of the flange of the cylinder 109 and at its right end a milled head 114. A disk 115 is secured to the stem 113, to the left of the head 114, so marked as to indicate how much the head is turned forward or back. The parts 92 to 115 inclusive constitute one form of refrigerator thermostat. A substantially similar construction is set forth and claimed in the application of Roehrich, assigned to me, Ser. No. 725,180, filed Oct. 11, 1912, entitled Refrigerator thermostat.

The construction of the parts 92 to 115 inclusive is such that, the space within the parts 92, 93, 94, 95 and 105 being filled with the expansive liquid, and with the cylinder 109 adjusted as will be described, as the temperature in the space about the cylinder 92 tends to rise, the volume of liquid tends to expand and to distend upward the diaphragm 95, to force upward the parts 99, 100, 101 and 102, to turn upward the lever 103 and to compress the spring 104. Consequently, if the shaft 84 has been turned counter-clockwise so that the rod 88 and its connected parts are free to move as has been described, the springs 91 and 74 tend to position the expansion valve in its intermediate position with the ring 73 and the valve end 76 both unseated. Under such conditions, as will be explained, liquid ammonia is free to expand into the evaporator. The consequent refrigerating effect within the refrigerator 18 tends to lower the temperature in the space about the cylinder 92 and to decrease the volume of the contained liquid. Under these conditions the spring 104, in opposition to the springs 91 and 74, by its action upon the lever 103 and by the action of the lever upon the rod 88, tends to reverse the movement of the movable parts referred to and to close the expansion valve by seating the disk 73, with the consequence of decreasing the flow of ammonia through the expansion valve and of permitting an increase of the temperature and volume of the liquid within the cylinder 92. An equilibrium is thus established with the effect of maintaining a fixed temperature, say of about 37 degrees, if the adjustment is such, within the refrigerator 18 so long as the expansion valve remains under the control of the refrigerator thermostat. The extent to which the valve end 76 may throttle the expansion valve, during the time of such control, is determined by the longitudinal adjustment of the valve end upon the valve 72. The part of the casing 70 adjacent to the flange of the carrier 71 serves to limit the movement of the carrier, of the diaphragm 8 and of the expansion valve to the left. So that, with a proper adjustment of the valve end 76, the latter may be adjusted so as never to be entirely seated. If at any time the machine should stand idle, so that the rise of temperature in the refrigerator 18 causes an expansion of the liquid within the cylinder 92 more than has been indicated as effective thus to control the expansion valve, such extra expansion is taken care of by a downward distending of the diaphragm 105 in opposition to the spring 108. While the diaphragm 105 is thus distended, and until after the spring 108 has restored the diaphragm to its upward normal position during the operation of the machine, the expansion valve, in so far as the refrigerator thermostat permits, is open. After the parts 92, 93, 94, 95 and 105 have been filled with the expansive liquid, the fine adjustment of the refrigerator thermostat, to produce the operating effects indicated, is made by turning the head 114 more or less to the right or to the left. A turning of the head 114 to the right turns the stem 113 to the right, so that its worm turns the flange of the cylinder 109 to the left. The cylinder 109 is thus turned downward so that the spring 108 and the flexible part of the diaphragm occupy lower positions and the space for the contained liquid is increased. And a reverse turning of the head 114 decreases the space for the contained liquid.

The upward branch at the termination of the pipe 39 leads into the under side of a horizontal cylindrical valve casing 116, having an intermediate central hub with a vertical valve seat at the back, with an internally threaded enlargement in front and with an outlet on the under side. As indicated by dotted lines in Fig. 4, in the casing 116 there are pressure transmitting passages extending between the ends of the casing outside of the hub. A diaphragm 117 closes the back end of the casing 116 and a cap 118 bolts the edge of the diaphragm to the casing. A slotted ring 119 screws into the threaded enlargement of the hub of the casing 116 so as to clamp in place a diaphragm 120 closing the front end of the hub. A cap 121 bolts the edge of a diaphragm 122 so as to close the front end of the casing 116; it has an axially central opening; and in front it has a cylindrical extension externally threaded at the end. A condenser water valve 123 is bolted to the center of the diaphragm 117; it is adapted to close the seat of the casing 116 from the back; it has one section of its stem, partially within the hub of the casing, screwed to and extending through the center of the diaphragm 120; it has another section of its stem secured to and extending through the center of the diaphragm 122; it has another section of its stem adapted to reciprocate within and through the opening and the extension of the cap 121; and it has a threaded end in front of the cap and extending into the casing 81. A spiral spring 124 surrounds the stem of the valve 123, within the extension of the cap 121, and at its back end bears against the main part of the cap. A cap 125, with an opening through its center, is screwed upon the end of the extension of the cap 121. A ring 126 loosely surrounds the stem of the valve 123, has a flange bearing upon the front end of the spring 124, and is adapted to reciprocate within the opening through the cap 125. A nut 127 is screwed around the stem of the valve 123 in front of the ring 126. The bracket 87 surrounds and supports the extension of the cap 121. The thrust of the spring 124 is regulated by the longitudinal adjustment of the nut 127. The cap 118 limits the maximum back movement of the valve 123, when it is opened. The spring 124 tends to close the valve 123 with a force determined by the adjustment of the nut 127. The diaphragms 117, 120 and 122 are preferably of phosphor bronze. The diameters of the unclamped parts of the diaphragms 117 and 122 are approximately equal. The diameter of the unclamped part of the diaphragm 120 is a trifle greater than the diameter of the space within the valve seat of the casing 116. The valve 123 and its connected parts are therefore practically balanced as against the pressure of incoming water. The use of a balanced condenser water valve in combination with the condenser of a refrigerating machine is set forth in the patent issued to me on the application of Carroll and Roehrich, No. 1,115,502, dated Nov. 3, 1914. And a construction substantially similar to the valve 123 and its connections is set forth and claimed in the application of Roehrich, assigned to me, Ser. No. 564,580, filed June 2, 1910, entitled Condenser water valve.

A very flexible diaphragm 128 surrounds the stem of the valve 123 and closes an opening in the casing 81, being clamped in place by a ring 129 fastened by screws to the inside of the casing. A collar 130 is screwed around the stem of the valve 123 outside of the diaphragm 128 and a flat headed tip 131 is screwed around the end of the stem inside the diaphragm, which is thus clamped by the collar and the tip. The longitudinal adjustment of the collar 130 and of the tip 131 makes a greater or less addition to the length of the stem of the valve 123. A flanged member 132 has its flange adjacent to the outside of the diaphragm 45 and has a stem with a flat bearing surface at its outer end.

A plate 133 is bolted to the box 41 so as to clamp the edge of the diaphragm 45 and to loosely surround the stem of the member 132. A lever 134, pivoted on the plate 133 just above the stem of the member 132, has an inner projection bearing upon the end of the stem and an outer projection at its extreme outer end bearing upon the tip 131. Thus the spring 124 operates to force frontward the parts 126, 127, 128, 130, 131, 134, 132 and 45 and to close the valve 123 unless opposed by sufficient pressure in the still, acting upon the diaphragm 45. Preferably the thrust of the spring 124 is such that the valve 123 begins to open at a pressure a little below 150 pounds and remains open sufficiently to normally permit of a flow of water in quantity sufficient to prevent the pressure in the still from exceeding 150 pounds during the heating period, as will be explained.

The horizontal branch at the termination of the pipe 39 leads into the left side of a vertical upper casing 135, having a valve seat opening downward from its lower wall. A diaphragm 136, preferably of phosphor bronze, closes the top of the casing 135. A combined bracket and cover casing 137 is bolted to the back of the casing 81; it has a horizontal cover part with a vertical opening through its center; and it has bolted to it the casing 135, so as to clamp the edge of the diaphragm 136. A lower casing 138 is bolted to the under side of the casing 135; it has a lateral opening in its back side; it has an outlet from its left side; and it has a cup-like part extending from the casing wall on each side of and under the outlet, but elsewhere spaced away from the main part of the casing, provided on top with a knife edge valve seat immediately under the valve seat of the casing 135. A cap 139 closes the under side of the casing 137. A valve 140 is adapted to close successively the seats of the casings 138 and 135, being respectively the lower and the upper seats; it has one section of its stem extending through the latter seat and the casing 135 and secured to the center of the diaphragm 136; and it has another section of its stem extending upward through the opening of the casing 137. A collar and two concentric spiral springs 141 surround the outside part of the stem of the valve 140 above the cover part of the casing 137 and above them is a head 142 secured to the top of the stem. The detail construction of the valve 140, the collar and springs 141 and the head 142 is shown too small for more particular description, but is so similar to the like parts shown in the front valve structure of Fig. 11 that it is believed that the present construction can best be understood by what will be said in reference to those parts. It will be noted, however, that in Figs. 4 and 10 the head 142 is flat on top—as is also the case in the rear valve structure of Fig. 11. A rock shaft 143 is journaled in the plate 83 and in the back wall of the casing 81. To the rear end of the shaft 143, outside of the casing 81, is pivoted a lever 144 extending to the right and at its end bearing upon the head 142. A waste pipe 145 has a vertical branch leading downward from the outlet of the casing 116 and a horizontal branch leading from the outlet of the casing 138 and leads to any convenient place of discharge.

The construction of the parts 135 to 144 inclusive is such that, on a clockwise turning of the shaft 143, the lever 144 is turned downward so as to depress the head 142 and, in opposition to the collar and springs 141, to unseat the valve 140 from its upper seat and to seat it on its lower seat. Water is then free to enter from the pipe 39 and to flow outward through the lateral opening of the casing 138. But on a counter-clockwise turning of the shaft 143, the collar and springs 141 act on the head 142 so as to unseat the valve 140 from its lower seat and to seat it on its upper seat. Water can no longer enter from the pipe 39, but may flow inward from the lateral opening of the casing 138 and escape through the pipe 145.

A valve structure 146 controls the supply of fuel gas to the burner 56 and has a valve and other internal parts similar to those within the rear valve structure of Fig. 11, to be described. A spiral spring 147, bearing at its lower end upon the top of the structure 146, surrounds a rod 148, which at its lower end, within the structure, serves as the stem of the valve therein, and at its upper end bears upon a collar 149, secured to the rod, so as to tend to close the valve. An upper casing 150 has an angle bracket extension whereby it is bolted to the back of the casing 81, a little below its top; it has a convex part with a centrally perforated hub on top; and, at the back of its convex part, it has a bracket extending upward and terminating in a forked top, with a transverse opening through the forks. A flanged member 151 has a stem, extending up through the perforation of the hub of the casing 150, with a collar around the stem a short distance above its flange; in its stem part it is adapted to reciprocate a short distance within the hub of the casing, but is prevented from an excessive upward movement by the contact of the collar with the top of the hub; and on top it is forked with a transverse opening through the forks. An easily flexible diaphragm 152, preferably of rubber, extends across the under side of the convex part of the casing 150, with the flange of the member 151 bearing upon it. A convex under casing 153 is bolted to the under side of the casing 150 so as to clamp the edge of the diaphragm 152. A pipe 154, consisting of an elbow and a vertical pipe length extending from the elbow upward into the center of the convex under surface of the casing 153, connects the lateral opening of the casing 138 with the interior of the casing 153. A lever 155 has its fixed pivot in the opening through the forks of the bracket of the casing 150; it has a short arm pivoted at the end within the opening through the forks at the top of the member 151; and it has a long arm pivoted at the end to the upper end of the rod 148.

The construction of the parts 146 to 155 inclusive is such that when, upon the valve 140 opening its upper valve seat and closing its lower valve seat, there is a flow of water through the lateral opening of the casing 138, such water passes upward through the pipe 154 and the casing 153 and forces upward the diaphragm 152 and the member 151 into the positions shown in Fig. 4. Thereupon the short arm of the lever 155 is lifted and its long arm is depressed so that, by means of the rod 148 and the collar 149 and in opposition to the spring 147, the valve within the structure 146 is opened. But when the valve 140 opens its lower valve seat and closes its upper valve seat, the water beneath the diaphragm 152 flows away from the casing 153 and the pipe 154 and escapes through the outlet of the casing 138 and the pipe 145. Thereupon the spring 147, acting through the collar 149, the rod 148, the lever 155 and the member 151 forces the diaphragm 152 downward and closes the valve within the structure 146.

An expansion tube 156, shown in Figs. 4 and 9, preferably of copper, is firmly secured at its top within the top of the pipe 31; it is closed at its lower end; it extends down within the pipe to a point a little distance above the closed lower end of the latter; and it occupies the space within the pipe sufficiently loosely to permit of its own free expansion under the influence of heat. A non-expansive rod 157, preferably of porcelain, rests on the closed lower wall of the tube 156 and extends upward nearly to the top of the tube. A short bearing piece 158, best shown in Fig. 5, rests on the top of the rod 157 within the tube 156 and on top has a knife edge bearing. The pipe 31, being preferably, in common with the vessels and conduits containing the ammonia refrigerant, of iron or steel, has the function of protecting the copper of the tube 156. The upper part of the head 30 has a transverse slot with a knife edge bearing 159 in the top of the slot, a short distance to the right of the bearing of the piece 158. A long lever 160 has, on top, near its right end a transverse angular groove engaging with the bearing 159, so as to form a fixed pivot, and on the under side, another transverse angular groove engaging with the bearing of the piece 158. A rod 161 is pivoted to the lever 160, near the left end of the lever, passes upward through an opening in a bracket 162 secured to the back and under side of the casing 81 and is pivoted on top to the left end of a short lever 163. As seen in Fig. 4 there is in the wall of the back lower part of the casing 81 a transverse reëntrant angle recess, and the lever 163 is in this recess. The height of the recess is shown in Fig. 5 by the short lines to the left and right of the plate 83 just above the lower brackets whereby it is supported, and the positions of the upper part of the rod 161 and of the lever 163 are indicated by dotted lines. A rock shaft 164 is journaled in the plate 83 and in that part of the back wall of the casing 81 that forms the vertical side of the reëntrant angle recess. The lever 163 is secured to the back end of the shaft 164. To the front end of the shaft 164, in front of the plate 83, is secured a centrally pivoted lever 165, with arms extending to the left and right and forked at the end of each arm. A spiral spring 166 surrounds a tubular extension of the bracket 162 and an enlarged part of the rod 161 and bears, on top, against the bracket and, at its lower end, against a collar 167 secured to the rod. The parts 156 to 160 inclusive constitute one form of still thermostat.

The construction of the parts 156 to 167 inclusive is such that, when the contents of the tank 28, and incidentally the other parts of the still, are being heated, preferably, to 300 degrees F., the tube 156 will be elongated and the rod 157 and the piece 158 will drop farther and farther in the tube. Simultaneously the spring 166, assisted by the weight of the left end of the lever 160 and acting through the collar 167 and the rod 161, depresses the lever 163 and turns the shaft 164 counter-clockwise, so as to depress the left arm of the lever 165 and to lift its right arm. Subsequently, when the heating of the still has terminated and as it cools down toward atmospheric temperature, the tube 156 contracts and forces upward the left end of the lever 160, the rod 161, the collar 167 and the lever 163, so as to compress the spring 166, to turn the shaft 164 clockwise, to lift the left arm of the lever 165 and to depress its right arm.

The downward branch of the pipe 15 leads into the back wall of an upper casing 168 of a rear valve structure, as best shown in Figs. 3, 11 and 12, having an outlet from its lower front wall and a horizontal valve seat between the inlet and the outlet. A cap 169 screws into and closes the lower end of the casing 168 and a diaphragm 170 closes its upper end. A valve 171 is adapted to close the seat of the casing 168 from above; it has an extension underneath with three guide lugs 172 reciprocating through the seat; it has a stem extending upward through the center of the diaphragm 170, with flanges 173 and 174 clamping the diaphragm below and above; it has a collar just above the flange 174; and it has the upper end of the stem of reduced diameter, with a threaded axial cavity in the top. A cover 175 is bolted to the casing 168, so as to clamp the edge of the diaphragm 170, and it surrounds the stem of the valve 171 just above its collar, so as to limit the upward movement of the valve when it is opened. A collar 176 surrounds the stem of the valve 171 at the lower end of its part of reduced diameter and a small spiral spring 177 surrounds the stem above the collar. A larger spiral spring 178 surrounds the collar 176 and the spring 177, being spaced away therefrom, and at the lower end bears upon the cover 175 and surrounds an extension around the opening through it. A flanged sleeve 179 surrounds the extreme top of the stem of the valve 171 and is adapted to reciprocate slightly thereon; it bears upon the top of the spring 177; it has its flange bearing upon the top of the spring 178; and it has in its top an enlarged cylindrical opening threaded at the top. A headed screw 180 is screwed into the cavity at the top of the stem of the valve 171 and it has its head within the lower part of the opening in the top of the sleeve 179. A flat headed nut 181 is screwed into the opening in the top of the sleeve 179, but so as to permit of a space between it and the head of the screw 180. The parts 179, 180 and 181 constitute a head like the head 142.

The construction of the parts 168 to 181 inclusive is such that, when force is applied to depress the nut 181 and the sleeve 179, the springs 178 and 177 are compressed so that the latter forces the collar 176 downward to close the valve 171; but, when the valve is closed by such action, the sleeve may slide along the stem of the valve until the head of the screw 180 strikes the nut 181. This flexibility of action prevents injury to the valve. When force is no longer applied to depress the head, the springs 178 and 177 restore the parts to the positions shown in Fig. 11, with the valve 171 open.

Centrally pivoted on a stem 182, extending from the back of the tank 28 through the back part of the cylinder 53, is a lever 183, having one arm extending frontward and the other arm extending backward and at its end adapted to bear upon the head of the nut 181. A connecting rod 184 is pivoted at its lower end to the end of the front arm of the lever 183 and at its upper end to the extreme left end of the lever 160. When, on a heating of the still, the end of the lever 160 drops, the rod 184 forces down the front arm of the lever 183 and lifts its rear arm from off the nut 181, so that the valve 171 is fully open. As the still cools down, after a heating, toward the atmospheric temperature, the lever 160 lifts the rod 184 and the front arm of the lever 183 and forces its rear arm upon the nut 181 so as to throttle the valve 171.

From the outlet of the casing 168 a coupling 185 leads into a valve casing 186 of a front valve structure, having a horizontal valve seat opening downward from its lower wall. A diaphragm 187 closes the top of the casing 186. A lower casing 188, similar to the casing 138, is bolted to the under side of the casing 186; it has an outlet from its front wall; and it has a horizontal valve seat in advance of its outlet at the upper edge of a cup-like part extending from the casing wall on each side of and under the outlet and spaced away from the left and right sides of the casing wall. A cap 189 closes the under side of the casing 188. A valve 190 has inserted in its upper and under surfaces, respectively, rings 191 and 192, preferably of rubber or soft metal, whereby it is adapted to close successively the seats of the casings 186 and 188, being respectively the upper and the lower seats; it is constructed like the valve 171; it has parts similar to the parts 172, 173 and 174 of that valve; and it is similarly connected with the diaphragm 187. Parts 193, 194, 195, 196, 197 and 198 correspond to the parts 175, 176, 177, 178, 179 and 180 and operate the same way. A connecting rod 199 at its lower end is pivoted to a nut 200, corresponding to the nut 181, and at its upper end is pivoted to the end of the lever 85. As shown in Figs. 1 and 12, the pipe 49 leads from an opening in the right wall of the casing 188, where it is spaced away from its cup-like part, so as to be in advance of the outlet. The outlet end of the pipe 49 leads into the pipe 145 above the head 27. From the outlet of the casing 188 a pipe 201 leads downward into the lowest part of the pipe 145.

The construction of the parts 185 to 201 inclusive is such that when the lever 85 is depressed by a counter-clockwise turning of the shaft 84, the rod 199 operates through the nut 200, in opposition to the springs 196 and 195, to unseat the valve 190 from its upper seat and to seat it on its lower seat. Water is then free, to the extent permitted by the valve 171, to enter from the coupling 185 and to flow through the pipe 49 and the connected lower part of the pipe 145 to any convenient place of discharge. But when the lever 85 is lifted by a clockwise turning of the shaft 84, the rod 199, assisted by the springs 196 and 195, operates through the nut 200 to unseat the valve 190 from its lower seat and to seat it on its upper seat. Water can no longer enter from the coupling 185, but may flow inward from the pipe 49, so as to completely drain it, and escape through the pipes 201 and 145.

As shown in Fig. 5, a flanged member 202 has its flange adjacent to the outside of the diaphragm 43 and has a stem with a flat bearing surface at its outer end. A plate 203 is bolted to the box 41 so as to clamp the edge of the diaphragm 43 and to loosely surround the stem of the member 202. A lever 204, pivoted on the plate 203 just below the stem of the member 202, has a very short upper arm ending in a projection bearing upon the end of the stem; it has pivoted to its right side, near its lower end, a rod 205 extending horizontally to the right and having a collar close to the lever; and it has pivoted to its extreme lower end a socket piece 206 extending to the right, with a threaded cavity in its right end. A spiral spring 207 surrounds the rod 205 and at the left bears upon its collar. At the top of and integral with the plate 83 is a bracket 208, having a threaded horizontal opening in which is screwed a flanged sleeve 209. The rod 205, at its right end, loosely reciprocates in the sleeve 209 and the right end of the spring 207 bears upon the flange of the sleeve. A detent 210 has a threaded stem screwed into the cavity of the piece 206, being held in longitudinal adjustment by a lock nut 211; it has a slanting surface on a part of its under side; and it has a tooth near the end of its under side. A stout pin 212 projects frontward from the plate 83 and engages with the slanting under surface of the detent 210. A flat spring 213 bears upon the detent 210 so as to keep it in close engagement with the pin 212. The construction is such that a rise of pressure in the still tends to force the diaphragm 43, the member 202 and the upper end of the lever 204 to the left and consequently to force the lower part of the lever, the rod 205, the piece 206, the nut 211 and the detent 210 to the right in opposition to the spring 207; that, upon a fall of such pressure, the spring tends to reverse such movements; that, when the detent moves to the right, the contact of its sliding surface with the pin 212 causes the right end of the detent to rise; and that, when the detent moves to the left, the spring 213, assisted by gravity, causes this right end to drop.

A flanged member 214 has its flange adjacent to the top of the diaphragm 42 and has a stem with a knife edge bearing on top. A plate 215 is bolted to the box 41 so as to clamp the edge of the diaphragm 42 and to loosely surround the stem of the member 214. A lever 216, pivoted to the plate 215 just to the left of the stem of the member 214, has a transverse angular groove bearing upon the knife edge of the member and has a connecting rod 217 pivoted to its right end. Bolted to the right side of the box 41 is an angle bracket 218, having a threaded vertical opening in which is screwed a flanged sleeve 219, being secured in any desired longitudinal position in reference to the bracket by a lock nut 220. The rod 217, a little below its pivoted top, passes through the sleeve 219 and is adapted to reciprocate therein; it has, below the sleeve, a section of enlarged diameter ending in a collar; and, at its end below the collar, as best shown in Fig. 4, it has two forks with a transverse pivot opening through them. A strong spiral spring 221 surrounds the rod 217, at the lower end bearing against its collar, and at the upper end bears against the flange of the sleeve 219. The construction is such that a rise of pressure in the still tends to force the diaphragm 42, the member 214, the lever 216 and the rod 217 upward in opposition to the spring 221; and that, upon a fall of such pressure, the spring tends to force said parts downward.

A bell crank lever 222 is adapted to turn on a pivot 223, projecting frontward from the plate 83; it has a right horizontal arm pivoted, by a pin 224, within the forks of the rod 217; and it has a downward vertical arm, provided with the anti-friction roller device, best shown in Fig. 19, and having a square corner at the lower left hand. A carrier 225, of anti-friction metal, is adapted to slide along the left surface of the vertical arm of the lever 222, just above its lower end; it has at the top a horizontal projection with a vertical opening through it; it has, just below the center, an oblong transverse slot; it has flange extensions inclosing the arm both front and back at the edge; and it has, toward the left, disk-like projections at the lower ends of the extensions with bearing openings through them. A roller 226, of anti-friction metal, is journaled in the openings through the projections of the carrier 225. In the drawings, since the roller 226 and the adjacent parts are shown in section, only the back extension and projection of the carrier 225 appear. A screw 227 extends through the slot of the carrier 225 into the vertical arm of the lever 222 and has a square head wider than the slot of the carrier with a vertical opening through the head. A spiral spring 228 bears on top against the under side of the horizontal projection of the carrier 225 and at the bottom against the upper surface of the screw 227. A small rod 229 is secured within the opening through the head of the screw 227, passes upward within the spring 228 and reciprocates within the opening through the horizontal projection of the carrier 225. The construction is such that the head of the screw 227 secures the carrier 225 to the lever 222 and yet permits of an up and down movement of the carrier and of the roller 226, to the extent permitted by the length of the slot in the carrier, and that the spring 228 tends to force the carrier into its extreme high position, as shown, with the roller 226 just at the left of the square corner of the lever 222.

A bell crank lever 230 is adapted to turn on a pivot 231, projecting frontward from the plate 83; it has a right horizontal arm with a tooth near the end adapted to engage the roller 226; and it has an upward vertical arm which at the top rests under the detent 210, as shown, when the detent is forced to the right, but which engages the tooth of the detent when the detent is forced to the left. An expansion spring 232 tends to pull the lever 230 to the left into the position shown. A socket piece 233 is pivoted, by a pin 224, to the outside of the forks of the rod 217 and has a threaded cavity in its lower end. A fork member 234 has oblong transverse slots through its forks and has at the top a threaded stem screwed into the cavity of the piece 233, being held in longitudinal adjustment by a lock nut 235. A bell crank lever 236 is secured to the end of the shaft 143 in front of the plate 83; it has a right horizontal arm having its end within the forks of the member 234 and pivoted thereto by a pin 237 within the slots; and it has a downward vertical arm. A downward vertical lever 238 is secured to the end of the shaft 84 in front of the plate 83. A rod 239 reciprocates in a horizontal opening through a bracket 240, integral with and projecting frontward from the plate 83; it has a collar near its right end; and at its right end it is forked with oblong transverse slots through the forks. The forks of the rod 239 straddle the vertical arm of the lever 236, from the left, a little below the center, and are pivoted thereto by a pin 241 extending through the arm and within the slots. A fork member 242 has a stem screwed within a threaded cavity at the end of the rod 239, to the left of the bracket 240; it has its forks straddling the lever 238, a little below the center; and it is pivoted to the lever by a pin 243. A spiral spring 244, weaker than the spring 221, surrounds the rod 239 to the right of the bracket 240 and, bearing upon the bracket, at its right end bears upon the collar of the rod so as, by means of the pin 241, to tend to turn the lever 236 counter-clockwise.

A small two-arm lever 245 is adapted to turn on a pivot 246, projecting frontward from the plate 83; it has a right arm with a tooth at the end adapted either to engage with the end of the vertical arm 236, as shown, or to rest under the arm; and it has a left arm with a vertical opening through its end. A flat spring 247 bears against the under side of the right arm of the lever 245 so as to tend to turn the lever counter-clockwise. A small vertical rod 248 is pivoted at its lower end, by a pin 249, within the forks at the right end of the right arm of the lever 165; it has its upper end passing loosely through the opening in the left arm of the lever 245; and it carries, on a threaded section just below the lever 245, a nut 250, held in longitudinal adjustment by a lock nut 251. A small two-arm lever 252 is adapted to turn on a pivot 253, projecting frontward from the plate 83; it has a left arm with a reëntrant angle recess adapted either to engage with the end of the lever 238, as shown, or to have the lever rest on the arm to the right of the recess; and it has a right arm with a vertical opening through its end. A flat spring 254 bears against the under side of the left arm of the lever 252 so as to tend to turn the lever clockwise. A small vertical rod 255, by means of a pin, passing through its lower end and similar to the pin 249, is pivoted within the forks at the end of the left arm of the lever 165; it has its upper end passing loosely through the opening in the right arm of the lever 252; and it carries, on a threaded section just below the lever 252, a nut 256, held in longitudinal adjustment by a lock nut 257.

As shown in Fig. 4, a flanged member 258 has its flange adjacent to the outside of the diaphragm 44 and has a stem with a flat bearing surface at its outer end. A plate 259 is bolted to the box 41 so as to clamp the edge of the diaphragm 44 and to loosely surround the stem of the member 258. A lever 260, pivoted to the plate 259 just below the stem of the member 258, has a very short upper arm ending in a projection bearing upon the end of the stem and it has pivoted to its extreme lower end a rod 261, having a collar close to the lever and extending backward through a threaded opening in the plate 83 and through the back wall of the casing 81. In this opening in the plate 83 is screwed a flanged sleeve 262, so as to loosely surround the rod 261. A spiral spring 263 surrounds the rod 261 and at the left bears upon its collar and at the right the spring bears upon the flange of the sleeve 262, so as to be adjusted by a turning of the sleeve back and forth in the plate 83. Secured to the back end of the rod 261 is an end piece 264, having through it a horizontal oblong slot, as shown in Fig. 17. A forked bracket 265 is bolted to the back of the casing 81 and has pivoted between its forks a bell crank lever 266. The lever 266 has an upward vertical arm, forked on top and pivoted to the piece 264 by a pin 267 passing through the slot of the piece, and it has a right horizontal arm to which is pivoted the upper end of a connecting rod 268.

A bracket 269, screwed to the back of the head 27, has a square opening extending through it, top from back to front and has in its backwardly extending right wall a vertical slot extending from the top downward for a considerable distance. A rectangular slide block 270, occupying and adapted to reciprocate in the opening of the bracket 269, has at the back end of its longitudinal center a more than semi-cylindrical recess which flares outward from its cylindrical part to the right side of the block and it has in its front end a vertical slot.

The opening in the head 27 through which the tube 48 extends has an enlargement in its upper part for seating a lead gasket 271 and the tube has a threaded section just below the head. A nut 272 screws around the threaded section of the tube 48 so as to compress the gasket 271 and to make a tight joint. Within the threaded top of the tube 48 is screwed a downwardly extending tubular cage 273 with an opening through its lower end. Below the cage 273 is a ring 274, of fusible alloy, normally held in position against the under side of the cage by the flanged foot of a stem 275, which extends upward through the ring and the opening in the tube nearly to the top. The alloy of the ring 274 is such that it will melt at some predetermined excessive high temperature. For instance, an alloy of three parts lead, three parts tin and one part bismuth melts at 311 degrees; an alloy of thirty-two parts lead, thirty-six parts zinc and eight parts bismuth melts at 320 degrees; and an alloy of thirty-two parts lead, twenty-eight parts zinc and eight parts bismuth melts at 330 degrees, all temperatures being Fahrenheit. Within the tube 48 below the foot of the stem 275 there is left considerable space, sufficient to contain the ring 274 if melted. A spiral spring 276 surrounds the stem 275 within the cage 273 and bears against its lower end. A head 277 is screwed around the threaded top of the stem 275 and is adapted to reciprocate in the cage 273 so as to compress the spring 276 more or less. The top of the tube 48 has a forked bracket extending frontward, with a three-arm lever 278 pivoted within the forks. The lever 278 has a back horizontal arm bearing upon the head 277; it has a front horizontal arm to which is pivoted the lower end of the rod 268; and it has an upward vertical arm, with a handle at the top, to which, below the handle, is pivoted a horizontal rod 279, that at the back end is pivoted, by a pin 280, within the slot of the slide block 269.

The rod 148 has hereinbefore been referred to as if it were of one piece. As a matter of fact it consists of a vertical upper part secured to the lever 155, of a vertical lower part extending within the structure 146, and of an intermediate horizontal part 281, that, as shown in Fig. 1, is pivoted at the right end to the top of the lower part of the rod, that is intermediately pivoted to the lower end of the upper part of the rod and that has a left end extending through the slot of the bracket 269 and terminating in a more than semi-cylindrical enlargement fulcrumed in the more than semi-cylindrical recess of the block 270.

The drawings disclose that the walls of the casing 81 are provided with stuffing boxes through which pass various shafts and pipes that have been described. This construction was for the purpose of making the casing 81 gas tight in case of an internal leak. But as I consider this feature unnecessary and undesirable, there has been no description thereof.

Without repeating what has been said about the operation of various detail parts, the general operation of the machine is as follows: The positions of the various movable parts, generally speaking, indicates that the still is being heated, so as to separate the absorbed ammonia from the absorbent water in the tank 28 and to expel it in gaseous condition into the condenser, where it is being cooled and again liquefied. In other words the heating period of the machine is in progress. The important exceptions to this statement as to the positions of the parts are that, for convenience of illustration, in Fig. 13 the collar 72, of the expansion valve, is shown as unseated and in Fig. 7 the check valve, described as the check valve from the still into the condenser, is shown as closed. At this part of the cycle, the similar check valve from the evaporator into the still is closed, as suggested by Fig. 7. Also in the final part of the heating period the back arm of the lever 183 is to be understood as entirely lifted from off the nut 181.

As shown in Fig. 4, the valve 123 is open, so that cooling water is passing from the pipe 15 through the conduit 14 and is flowing off through the pipe 39, the casing 116 and the pipe 145. The coldest water passing through the lower pipes of the conduit 14, within the tank 4, takes up heat from the liquefied and liquefying ammonia in the lower part of the tank and then the water, becoming considerably warmer as it flows through the upper part of the pipe 39, extracts some of the heat from the countercurrent hot gas passing through the casing 33, the pipe 35 and the casing 36. The adjustment of the spring 124, by the nut 127, is such as to keep the valve 123 open sufficiently to normally maintain a head pressure of 150 pounds in the still, as indicated by the gage 13. Any tendency of the head pressure to rise acts through the parts 45, 132, 134 and 131, in opposition to the spring 124, so as to tend to open the valve 123 still farther for the admission of more cooling water. But the tendency of more such water is to reduce the head pressure and thus to permit the spring 124 to tend to close the valve 123. An equilibrium is thus established and the head pressure remains practically constant until the end of the heating.

The normal limit of the heating period is preferably fixed at 300 degrees F., as determined by the adjustment of the nut 250, and as indicated by the thermometer 46. At that limit the tank 4, if properly proportioned, is full to about three-quarters of its height. At that limit, the lever 160 having been gradually dropping and the right end of the lever 165 being lifted as has been described, the rod 248 and the nut 250 trip the lever 245, in opposition to the spring 247, so as to release the lever 236. Thereupon the collar and springs 141 act through the head 142 to turn the lever 144, the shaft 143 and the lever 236 counter-clockwise, until the pin 237 reaches the top of its containing slots and the pin 241 reaches the right end of its containing slots and so that the tooth of the lever 245 rests under the vertical arm of the lever 236; and also to cause the valve 140 to open its lower seat and to close its upper seat. Thereupon water flows away from beneath the diaphragm 152 through the outlet of the casing 138 and permits the spring 147 to close the valve within the structure 146. The burner 56 is thus extinguished and the burner 55 alone remains lighted.

As the heating of the still terminates, the check valve into the condenser closes and the pressure within the still drops rapidly, eventually falling to about 25 inches of vacuum, as indicated by the gage 34, when the still reaches atmospheric temperature. When the pressure upon the diaphragm 45 has dropped slightly, the spring 124 closes the valve 123, thus preventing a further flow of water through the condenser, but permitting what is already in the conduit 14 to remain. As the pressure upon the diaphragm 43 begins to drop, the spring 207 forces the detent 210 to the left, as has been described, so that the tooth of the detent engages and locks the vertical arm of the lever 230. And as the pressure upon the diaphragm 42 decreases, there is an increasing tendency of the spring 221 to expand and to bear upon the parts 222 and 224 so as to turn clockwise the levers 222, 230 and 236; but such tendency is made ineffective by such locking of the lever 230 by the detent 210.

The adjustment of the nut 256 is preferably such that, when the temperature of the still has fallen to 130 degrees, the lever 160 having been gradually rising and the left end of the lever 165 being lifted as has been described, the rod 255 and the nut 256 trip the lever 252 in opposition to the spring 254, so as to release the lever 238. Thereupon the spring 244 forces the parts 239 and 242 to the right, until the left end of the slots of the rod 239 strike the pin 241, and turns the lever 238, the shaft 84 and the levers 85 and 86 counter-clockwise, so that the lever 238 rests on the left arm of the lever 252 to the right of its recess. Thereupon the rod 199 drops and causes the valve 190 to open its upper seat and to close its lower seat. Consequently cooling water from the pipe 15 flows past the valves 171 and 190 and through the pipe 49, first assisting in cooling down the still and thereafter maintaining a proper coolness therein during the ensuing refrigerating, or absorption, period. With water flowing through the pipe 49 in full volume, the tendency would be to make the still colder than necessary and to waste the water. But the parts 182, 183 and 184 are preferably so constructed or adjusted that as the falling temperature in the still approaches 87 degrees, as indicated by the thermometer 46, the lever 160 and the rod 184 being gradually lifted, the rear arm of the lever 183 bears upon the nut 181, so as to throttle the valve 171 somewhat and to diminish the volume of water entering the casing 186 sufficiently to maintain a temperature of 87 degrees in the tank 28 during the refrigerating, or absorption, period. Simultaneously with this actuation of the valve 190, the lever 86 releases the rod 88, as has been described, and puts the expansion valve under the control of the refrigerator thermostat. Liquid ammonia, flowing from the tank 4 and the pipe 5, begins to vaporize as it passes the expansion valve. The vaporizing ammonia, flowing through the evaporator, takes up heat from the air within the refrigerator 18 and from the brine within the tank 19, and, having forced open the check valve leading into the still, delivers, through the pipe 26, the heat, thus taken up, to the absorbent water in the tank 28. The heat thus delivered is carried away, slightly by radiation in cooler weather, but principally by the water flowing through the pipe 49. The active refrigerating, or absorption, period is thus in full progress. The refrigerator thermostat simply tends to throttle the expansion valve and operates to keep the temperature in the refrigerator 18 from falling below its predetermined limit.

As the absorption of the expanded ammonia by the water in the still progresses, the pressure, as indicated by the gage 34, gradually rises from 25 inches vacuum to 45 pounds. The tank 4 is preferably of such capacity and the machine is so charged that at that time there is enough liquid ammonia remaining in the tank to cover the lower pipes of the conduit 14. At a pressure of 45 pounds, such being preferably the adjustment of the sleeve 209, the pressure upon the diaphragm 43 acts, in opposition to the spring 207, to force the detent 210 to the right sufficiently to turn and to unlock the lever 230 from the lever 222, with the result that the spring 221, forcing downward the parts 217, 224, 233, 235, 234 and 237, turns clockwise the levers 222 and 236 and the shaft 143 and causes the vertical arm of the lever 222, assisted by the roller 226 in opposition to the springs 228 and 232, to mount the horizontal arm of the lever 230 to the left of its tooth. At the same time the detent 210, in opposition to the spring 213, jumps farther to the right and upward so that the vertical arm of the lever 230 rests under the detent. Such turning of the lever 236 causes its vertical arm again to engage the tooth of the lever 245 in the position shown in Fig. 5; it also, through the pin 241, moves the parts 239 and 242 to the left and compresses the spring 244. This movement turns clockwise the lever 238, the shaft 84 and the levers 85 and 86. Such turning of the lever 238 puts it in a position to engage the recess of the lever 252. The clockwise turning of the lever 85, acting through the rod 199, causes the valve 190 to open its lower seat and to close its upper seat. Consequently no more water can enter the pipe 49 and the water already therein flows away through the pipe 201. The clockwise turning of the lever 86 acts through the pin 90 upon the rod 88 so as to absolutely close the expansion valve by seating the collar 73. The closing of the expansion valve results in a quick closing of the check valve into the still. The clockwise turning of the shaft 143 acts through the lever 144 and the head 142, in opposition to the collar and springs 141, to cause the valve 140 to open its upper seat and to close its lower seat. Thereupon water flows through the casing 138 and forces upward the diaphragm 152 in the position shown in Fig. 4, so that, in opposition to the spring 147, the valve within the structure 146 is opened and the burner 56 is lighted from the burner 55. The heating period thus begins. It will be noted that, although the lever 160 and the nut 256 continued to rise as the temperature of the still fell from 130 to 87 degrees, yet in the subsequent heating of the still these parts fall again, so as to permit the spring 254 to effect an engagement of the lever 252 with the lever 238 before the nut 250 trips the lever 236 at the end of the heating. Likewise as the still cools down, the nut 250 is depressed so as to permit the spring 247 to turn the lever 245 into a position to engage the lever 236.

The heating of the still being in progress, the pressure upon the diaphragm 42 gradually compresses the spring 221. The adjustment of the sleeve 219 is preferably such that at about 130 pounds pressure, in opposition to the spring 221, the rod 217 lifts the parts 224, 233, 235 and 234, without, however, disturbing the position of the pin 237 and its connected parts, and turns counter-clockwise the lever 222 into the position shown in Fig. 5 with the roller 226 between the lever 222 and the tooth of the lever 230. As has been stated, in the progress of the heating as the pressure in the still approaches 150 pounds, the valve 123 opens. Quite independently, the check valve into the condenser opens when the pressure in the still exceeds the pressure in the condenser by about two or three pounds, as indicated by the gages 34 and 13. During the heating period the refrigerator 18 is kept cold by the brine in the tank 19. The normal cycle of operation is thus complete.

If, in the course of the heating, there should be a cessation of the flow of water entering the pipe 15, the diaphragm 152 being higher than the valve seat in casing 116, the water flows away from beneath the diaphragm through the parts 154, 138, 135 and 39 (in its terminal horizontal and vetrical branches) and escapes through the valve seat of the casing 116 and the pipes leading therefrom. Thereupon, in the same manner as has been described as occurring at the end of the heating, the burner 56 is extinguished and the burner 55 alone remains lighted. But in this case there is no operation of any other mechanical parts (aside from a closing of the check valve into the still) and a resumption of the flow of cooling water causes a continuation of the heating in consequence of the lifting of the diaphragm 152.

But, if, during the heating period, for any reason, as by a breakage of the mechanism, an excessive pressure should develop in the still, say of 190 pounds, as determined by the adjustment of the sleeve 262, such pressure forces frontward the diaphragm 44, the member 258 and the upper end of the lever 260 and consequently, in opposition to the spring 263, forces backward the lower part of the lever, the rod 261, the piece 264 and the pin 267, so as to turn clockwise the lever 266. Such turning of the lever 266 depresses the rod 268 and turns the lever 278 counter-clockwise. Such turning of the lever 278 pulls frontward the rod 279, the pin 280 and the block 270, so as to remove the support of the left end of the part 281. Thereupon, quite independently of the position of the diaphragm 152 and the upper part of the rod 148, the spring 147 operates to close the valve in the structure 146 and to extinguish the burner 56, thus terminating the heating of the still. In this case the termination is absolute and there is no resumption of the cycle of operation, although the slot in the piece 264 permits the parts 261, 260, 258 and 44 to resume their normal positions as the still cools down, until after manual force has been applied, under circumstances inviting an inspection and, if necessary, a repair of the mechanism, to turn the lever 278 clockwise and to restore the position of the block 270 as the fulcrum of the left end of the part 281.

If there should be a breakage of the mechanism controlling the normal termination of the heating, even under circumstances where the head pressure continued normal, as by an adequate supply of condensing water, the temperature of the still might become excessive. In such case the ring 274, according to its composition as predetermined, would melt and run down into the lowest part of the tube 48. Thereupon the spring 276 is free to force upward the stem 275 and the head 277 and consequently turns the lever 278 counter-clockwise. Here also, as in the case of an excessive pressure in the still, the support of the left end of the part 281 is removed and such removal absolutely terminates the heating of the still. And again the normal cycle of operation is not renewed until after a new ring 274 has been put in place and the fulcrum of the left end of the part 281 has been manually restored under circumstances inviting an inspection and repair of the mechanism.

Not merely does a cessation of the flow of water entering the pipe 15, if occurring during the heating, result in an interruption of the cycle of operation, but such interruption also occurs when there is such a cessation during the absorption period. For then, no heat being taken from the ammonia being absorbed in the still, there is a premature rise of pressure to the 45 pound limit; but the heating cannot start because, the water under the diaphragm 152 having drained away, as has been explained, the diaphragm is depressed and the burner 56 is not lighted. And it is apparent that the heating of the still can never begin, under any circumstances, unless there is available a supply of cooling water to flow from the pipe 15 through the condenser and to elevate the diaphragm 152. Hence one way to shut down the machine would be to close the valve 16. Another way to shut down would be to turn off the heating agent for the still. For then, when the pressure in the still rose to 45 pounds, the expansion valve would close, the flow of water through the pipe 49 would cease and the water already there would drain away, as has been described; but, in other respects, the cycle of operation would cease. In practice, the machine is more speedily shut down by means of a hand operated stop valve, not shown, controlling the pipe 5.

Assume that, as has been described, the still continues to absorb until the pressure therein rises to 45 pounds, the temperature of the solution being kept at 87 degrees. Then, at the end of the absorption period, there will be a 52 per cent. solution in the still, that is to say 27 pounds of ammonia in solution with every 25 pounds of water. The liberal allowance of 700 cu. in. for the 25 pounds of water (28 cu. in. per pound) and 1357 cu. in. for the 27 pounds of ammonia (50.25 cu. in. per pound) calls for a still of a net capacity of 2027 cu. in. Allowing 247 cu. in. for additional space, by way of margin, gives 2304 cu. in., or 1⅓ cu. ft., as the net capacity of the still for every 25 pounds of absorbent water that it is to contain. Three tenths of 2304 cu. in. is 691 cu. in., which is so near the 700 cu. in. allowed for the 25 pounds of water as to give the convenient rule that, in charging, after exhausting the air through the gages 47 and 12, the still may be filled with water up to three-tenths of its net capacity.

When the still is heated to 300 degrees under a head pressure of 150 pounds, the solution is reduced to 13 per cent., so that, for every 25 pounds of water, there remain 3¾ pounds of ammonia in solution with the water; and 23¼ pounds of ammonia has passed into the condenser. Considering the temperature in the evaporator to be minus 60 degrees at the beginning of the absorption period and plus 32 degrees at the end of that period (the pressure in the evaporator, owing to the tendency of the check valve to close, being two pounds more than the pressure in the still), the average temperature of the vaporizing ammonia is minus 14 degrees. Assuming that on an average the temperature of the liquid ammonia entering the expansion valve is 84 degrees, and allowing 106.6 B. T. U. for cooling down the liquid from that temperature to minus 14 degrees, the net refrigerating effect of one pound of vaporizing ammonia is 476.3 B. T. U., which is equivalent to the melting effect of 3.3 pounds of ice. Therefore the 23¼ pounds of ammonia expelled from every 25 pounds of water in the still at each heating produce just about 77 pounds of refrigeration. The still, if small, may easily have three automatic heatings per twenty-four hours. Accordingly the capacity of the machine may be based on its ability to have three heatings of the still per day. Hence a still having a net capacity, such that 25 pounds of water will fill it three-tenths full, will be capable of supplying 231 pounds of refrigeration per day. But as with every machine, whether of the absorption or the compression type, there is a slight loss of refrigeration at both ends of the evaporator. It is therefore more conservative to consider the actual refrigeration produced inside of the refrigerator 18, under the conditions above described, to be equal to the melting of 215 pounds of ice.

In passing into the condenser, the 23¼ pounds of liquid ammonia, (allowing, as before, 50.25 cu. in. per pound) require a space of only 1168 cu. in. But additional space must be allowed both for the liquid ammonia remaining in the condenser at the end of the absorption period and also for ammonia vapor above the liquid ammonia in the condenser at the end of the heating period. If the still has a net capacity of 1¼ cu. ft. for every 25 pounds of absorbent water, a like capacity of the condenser is sufficient.

If a still of 1⅓ cu. ft. net capacity can produce 215 pounds of refrigeration, within the refrigerator 18, with three heatings per twenty-four hours, it follows that to produce 100 pounds of refrigeration, within the refrigerator, requires a still of .62 cu. ft. net capacity. There would be at the beginning of each such heating 12.6 pounds of ammonia in solution with 11.6 pounds of water. At the end of each heating, the quantity of ammonia remaining in the solution would be reduced to 1.7 pounds. And the amount of heat required to produce the 100 pounds of refrigeration would be three times the amount of heat necessary to raise, in a properly constructed still, from 87 degrees to 300 degrees, a solution that, at the beginning of each heating, contains 11.6 pounds of water and 12.6 pounds of ammonia, and that, at the end of the several heatings, contains 11.6 pounds of water and 1.7 pounds of ammonia, the specific heat of liquid ammonia being a little greater than that of water.

The rating of the capacity of a machine on the assumption that the still will be heated three times per day is somewhat arbitrary. For with a small, household machine the heating of the still may be made to occur at least six times per day and with a machine of several tons capacity such heating may occur not oftener than once a day.

The construction whereby the beginning of the process of expelling into the condenser the refrigerant previously drawn from the evaporator is made dependent upon the presence of a supply of cooling water for the condenser and whereby such process is temporarily suspended in case of a cessation of such supply, is an adaptation to this type of machine of a similar general construction employed in connection with certain compression machines, as illustrated in the patents to Wolcott, 684,894, Oct. 22, 1901, and to Bishop, 1,050,910, Jan. 21, 1913.

The critical time for the check valve into the still is at the beginning of the heating, when the pressure in the still starts on a gradual rise, and for the check valve into the condenser is at the end of the heating when such pressure starts on a gradual fall. Under such conditions any ordinary check valve would not hold perfectly tight against ammonia. By the construction shown in Figs. 7 and 8, by means of the diaphragm and by the general means for applying pressure thereto, a multiplying effect, in respect to the total net pressure exerted, is secured that results in a total closing of the valves.

By controlling the flow of condensing water according to the conditions of pressure in the still, its use is fully economized. For, with a maximum pressure in the still in the absorption period of say 45 pounds, and with the condenser water valve so adjusted as not to open until after a pressure in the still of say 150 pounds has been approximated, it is apparent that there can be a flow of condensing water only after the beginning of each heating of the still and that such flow must terminate with a slight drop of pressure almost immediately after the cessation of such heating. There would be a like economy of condensing water, where an absorber and an aqua ammonia pump are interposed, according to well known constructions, between the evaporator and the still, and where the conditions of pressure in such a still control, as herein, the flow of condensing water. On the other hand, if the flow of condensing water were controlled by the conditions of pressure in the condenser, since at 84 degrees the corresponding pressure of saturated ammonia vapor is 150 pounds, there would be a full flow of condensing water whenever the atmospheric temperature outside of the condenser exceeded 84 degrees and a partial flow at slightly lower temperatures.

By the construction permitting a regulation of the flow of condensing water so as to maintain a predetermined head pressure in the still in the latter part of the heating, and by heating the still normally to a predetermined high temperature limit, it results that at the end of the heating the solution in the still has been reduced to a predetermined weakness. Consequently the cost of condensing water and of the heating agent can be balanced against each other so as to secure the maximum economy of operation. If, on the other hand, the heating were continued merely to some high temperature limit under variable conditions of head pressure, it would be impossible to predetermine the weakness of the solution in the still at the end of the heating and no such economy of operation could be determined.

By the inclusion of a slantingly ascending double pipe dehydrator between the main part of the still and the top of the condenser, the separation and draining back of the little water that is entrained upward with the gaseous ammonia expelled from the still, during its heating, is so nearly complete that the liquefied ammonia in the condenser tank is practically anhydrous. This is shown by the fact that on the opening of the expansion valve, at the beginning of each absorption period, frost immediately begins to appear just beyond the valve. The placing of the check valve leading into the condenser at the top of the dehydrator obviates any pocket and causes all liquid either to drain back into the still or else to pass downward into the condenser.

By causing an automatic closing of the expansion valve and a heating of the still to occur with the valve in a closed condition, the inflow of liquid ammonia into the evaporator is prevented until such ammonia can vaporize and, in an expanded state, be absorbed in the still. Such a construction is indispensable where, as here, there is a gravity feed from the condenser through the evaporator.

By causing a stopping of the heating of the still to occur in case the pressure therein in the time of heating rises above a normal limit, the automatic operation of the machine is made safe and the need of personal supervision during the heating period is eliminated.

By constructing the machine with an upward course for the refrigerant from the main part of the still to the top of the dehydrator and thence with a downward course through the condenser and evaporator back into the still, it happens that, at the opening of the expansion valve at the beginning of each absorption period, the exceedingly slight quantity of water that has escaped over from the dehydrator, and that has lodged above the expansion valve, drains through immediately into the still, so that the original supply of absorbent water remains intact. If, as with the ordinary construction, there were an upward feed from the refrigerant reservoir into the evaporator, there would have to be a by-pass into the still, from the lowest part of the reservoir, that would have to be opened once in a while in order to expel the accumulated water.

By causing the refrigerator thermostat to control the expansion of refrigerant into the evaporator during the absorption period, and by causing the dominating means that controls the heating of the still at intervals to make the thermostat inoperative during such heating, the supreme control of the machine is placed with the means that start and stop the heating of the still, and, if such means are properly chosen, the maximum economy of the heating agent is attained.

By keeping the still cooled down, by a flow of water, to some convenient temperature limit during the absorption period and by causing that period to terminate and the heating of the still to normally begin when the pressure of absorbed refrigerant in the still has risen to a predetermined limit, it is made certain that the still has received its full charge of ammonia. Furthermore any desired reserve supply of liquid ammonia may be allowed to remain in the condenser. An uneconomically premature starting of the heating is prevented in case there is an absence of cooling water for the condenser.

By utilizing the pressure on the check valve diaphragms to increase the forces tending to close the check valve from the still and the check valve from the evaporator, these valves are tightly closed from the very beginnings of the times when they should be closed.

What I have invented and what I desire to have protected by Letters Patent is expressed in claims as follows:

I claim:

1. In an absorption refrigerating apparatus, in combination, a still, means for heating said still, means for cooling said still in alternate cycles, means responsive to a change in conditions in the still for automatically discontinuing the heating of said still, and means responsive to a change in conditions in the still for automatically discontinuing the cooling of said still.

2. In an absorption refrigerating apparatus, in combination, a still, means for heating said still, means for cooling said still after each heating thereof, means automatically terminating the heating of said still when the absorbent therein has been reduced to a predetermined state of weakness, and means automatically terminating the cooling of said still when the absorbent therein has reached a predetermined state of saturation.

3. In an absorption refrigerating apparatus, in combination, a still, means for heating said still, means for cooling said still after each heating thereof, means automatically terminating the heating of said still when the absorbent therein has been reduced to a predetermined state of weakness, means automatically terminating the cooling of said still when the absorbent therein has reached a predetermined state of saturation, and means automatically operative to start the operation of said heating means after such state of saturation has been reached.

4. In an absorption refrigerating apparatus, in combination, a still, a condenser, an evaporator, means for connecting said elements to form a circuit from the still through the condenser and evaporator back to the still, means for heating said still, means for cooling said still, means responsive to a change in conditions in said circuit to control said heating means, and means responsive to a change in conditions in said circuit for controlling the cooling means for said still.

5. In combination, a condenser, an evaporator, a still adapted to contain an absorbent, means for connecting said elements to form a circuit from said still through the condenser and evaporator back to said still, means for preventing a back flow of refrigerant from the condenser into said still and from said still into said evaporator, mechanism adapted to regulate the expansion of refrigerant from said condenser into said evaporator and its absorption in said still, means for heating said still, means for cooling said still, means responsive to a change in conditions in said circuit for controlling said heating means, and means responsive to a change in conditions in said circuit for controlling said cooling means.

6. In combination a conduit for the circulation of refrigerant consisting of a condenser, an evaporator leading from said condenser and a still adapted to contain an absorbent and leading from said evaporator into said condenser, means for regulating the flow of refrigerant from said condenser into said evaporator and its expansion within the evaporator, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, and means for utilizing temperature and pressure conditions in said conduit to control such heating and cooling operations.

7. In combination a conduit for the circulation of refrigerant consisting of a condenser, an evaporator leading from said condenser and a still adapted to contain an absorbent and leading from said evaporator into said condenser, a feed valve controlling the flow of refrigerant from said condenser into said evaporator and its expansion within the evaporator, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, and means for utilizing temperature and pressure conditions in said conduit to control such heating and cooling operations, to close said valve simultaneously with such heating and to permit of it thereafter being open.

8. In combination a conduit for the circulation of refrigerant consisting of a condenser, an evaporator leading from said condenser through a place to be refrigerated and a still adapted to contain an absorbent and leading from said evaporator into said condenser, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, and means for utilizing temperature and pressure conditions in said place and in said conduit to control such heating and cooling operations and to maintain a predetermined temperature in said place.

9. In combination a conduit for the circulation of refrigerant consisting of a condenser, an evaporator leading from said condenser through a place to be refrigerated and a still adapted to contain an absorbent and leading from said evaporator into said condenser, a feed valve controlling the flow of refrigerant from said condenser into said evaporator and its expansion within the evaporator, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, means for utilizing temperature and pressure conditions in said conduit to control such heating and cooling operations, to close said valve simultaneously with such heating and to permit of it thereafter being open, and a thermostat controlled by the temperature in said place and regulating said valve in the intervals between such heatings.

10. In combination a condenser, an evaporator leading from said condenser, a still adapted to contain an absorbent and leading from said evaporator into said condenser, means for regulating the flow of refrigerant from said condenser into said evaporator and its expansion within the evaporator, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, and means for utilizing temperature and pressure conditions in said still to control such heating and cooling operations.

11. In combination a condenser, an evaporator leading from said condenser, a still adapted to contain an absorbent and leading from said evaporator into said condenser, a feed valve controlling the flow of refrigerant from said condenser into said evaporator and its expansion within the evaporator, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, and means for utilizing temperature and pressure conditions in said still to control such heating and cooling operations, to close said valve simultaneously with such heating and to permit of it thereafter being open.

12. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, and means for utilizing temperature and pressure conditions in said place and in said still to control such heating and cooling operations and to maintain a predetermined temperature in said place.

13. In combination a condenser, an evaporator leading from said condenser through a place to be refrigerated, a still adapted to contain an absorbent and leading from said evaporator into said condenser, a feed valve controlling the flow of refrigerant from said condenser into said evaporator and its expansion within the evaporator, means for preventing a back flow of refrigerant from said condenser into said still and from said still into said evaporator, means for heating at intervals said still, means for permitting a flow of cooling water to said condenser in the time of such heating and to said still when absorbing refrigerant from said evaporator, means for utilizing temperature and pressure conditions in said still to control such heating and cooling operations, to close said valve simultaneously with such heating and to permit of it thereafter being open, and a thermostat controlled by the temperature in said place and regulating said valve in the intervals between such heatings.

14. In combination a condenser, an evaporator leading from said condenser, an absorption apparatus operative to draw expanded refrigerant from said evaporator and upon being heated to expel such refrigerant into said condenser, means for regulating the flow of refrigerant from said condenser into said evaporator and its expansion within the evaporator, and means controlled by the pressure in said apparatus and operating when such pressure exceeds a predetermined limit to permit a flow of cooling water to said condenser.

15. In combination a condenser having a cooling water passage, an evaporator leading from said condenser, an absorption apparatus operative to draw expanded refrigerant from said evaporator and upon being heated to expel such refrigerant into said condenser, means for regulating the flow of refrigerant from said condenser into said evaporator and its expansion within the evaporator, a valve controlling said passage, and means tending to close said valve but controlled by the pressure in said apparatus and operating when such pressure exceeds a predetermined limit to open the valve and to keep it open to an extent corresponding to the variations of such pressure when above such limit.

16. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means for heating at intervals said still, and means controlled by the pressure in said still and operating when such pressure exceeds a predetermined limit to permit a flow of cooling water to said condenser.

17. In combination a condenser having a cooling water passage, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means for heating at intervals said still, a valve controlling said passage, and means tending to close said valve but controlled by the pressure in said still and operating when such pressure exceeds a predetermined limit to open the valve and to keep it open to an extent corresponding to the variations of such pressure when above such limit.

18. In combination a condenser, an evaporator leading from said condenser, a still adapted to contain an absorbent and leading from said evaporator into said condenser, means for preventing a back flow of refrigerant from said condenser into said still and from said still into said evaporator, mechanism adapted to regulate the flow of refrigerant from said condenser into said evaporator, its expansion within the evaporator and its absorption in said still, means automatically operative at intervals to make said mechanism inoperative and to heat said still, means terminating such heating when such absorbent and the absorbed refrigerant therewith have been reduced to a predetermined weakness, and means operating after the termination of such heating to permit said mechanism to operate.

19. In combination a condenser, an evaporator leading from said condenser, a still adapted to contain an absorbent and leading from said evaporator into said condenser, means for preventing a back flow of refrigerant from said condenser into said still and from said still into said evaporator, mechanism adapted to regulate the flow of refrigerant from said condenser into said evaporator, its expansion within the evaporator and its absorption in said still, means automatically operative at intervals to make said mechanism inoperative and to heat said still, means terminating such heating when such absorbent and the absorbed refrigerant therewith have been reduced to a predetermined weakness, and means operating after such heating upon the cooling down of said still to a predetermined limit to permit said mechanism to operate.

20. In combination a condenser, an evaporator leading from said condenser, a still adapted to contain an absorbent and leading from said evaporator into said condenser, mechanism for regulating the flow of refrigerant from said condenser into said evaporator, its expansion within the evaporator and its absorption in said still, means for heating at intervals said still, and means preventing the starting of such heating until said mechanism is so acted upon as to prevent a flow of refrigerant into said still and a flow of cooling water to the still is prevented.

21. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the flow of refrigerant from said condenser into said evaporator and its expansion within the evaporator, means for heating at intervals said still, and means preventing the starting of such heating until said feed valve is closed and until a flow of cooling water to said still is prevented.

22. In combination a condenser, an evaporator leading from said condenser, a still adapted to contain an absorbent and leading from said evaporator into said condenser, mechanism for regulating the flow of refrigerant from said condenser into said evaporator, its expansion within the evaporator and its absorption in said still, means for heating at intervals said still, and means preventing said mechanism from permitting a flow of refrigerant into said still and preventing a flow of cooling water to the still until after the termination of such heating.

23. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the flow of refrigerant from said condenser into said evaporator and its expansion within the evaporator, and means preventing the opening of said feed valve and a flow of cooling water to said still until after the termination of such heating.

24. In combination a condenser casing having a cooling water passage, an evaporator leading from said casing, an apparatus operative to draw expanded refrigerant from said evaporator and to expel it through an outlet, a water pipe in series with said passage, a gas conduit leading upward from said outlet for a distance and then descending into said casing and having a section surrounding a part of the length of said pipe, means for regulating the flow of refrigerant from said casing into said evaporator and its expansion within the evaporator, means for preventing a back flow of refrigerant from said casing into said apparatus, and means for permitting a flow of cooling water through said passage and pipe when said apparatus is expelling refrigerant through its outlet.

25. In combination a condenser casing having a cooling water passage with the inlet below the outlet, an evaporator leading from said casing, an apparatus operative to draw expanded refrigerant from said evaporator and to expel it through an outlet, a water pipe leading from the outlet of said casing, a gas conduit leading upward from the outlet of said apparatus for a distance and then descending into said casing and having a section surrounding a part of the length of said pipe, means for regulating the flow of refrigerant from said casing into said evaporator and its expansion within the evaporator, means for preventing a back flow of refrigerant from said casing into said apparatus, and means for permitting a flow of cooling water through said passage and pipe when said apparatus is expelling refrigerant through its outlet.

26. In combination a condenser having a cooling water passage, an evaporator leading from said casing, an apparatus operative to draw expanded refrigerant from said evaporator and to expel it through an outlet, a water pipe in series with said passage, a gas conduit leading upward from said outlet for a distance and then descending into said casing and having a section surrounding a part of the length of said pipe, means for regulating the flow of refrigerant from said casing into said evaporator and its expansion within the evaporator, a check valve interposed in said conduit above its section containing a part of said pipe, and means for permitting a flow of cooling water through said passage and pipe when said apparatus is expelling refrigerant through its outlet.

27. In combination a condenser casing having a cooling water passage with the inlet below the outlet, an evaporator leading from said casing, an apparatus operative to draw expanded refrigerant from said evaporator and to expel it through an outlet, a water pipe leading from the outlet of said casing, a gas conduit leading upward from the outlet of said apparatus for a distance and then descending into said casing and having a section surrounding a part of the length of said pipe, means for regulating the flow of refrigerant from said casing into said evaporator and its expansion within the evaporator, a check valve interposed in said conduit above its section containing a part of said pipe, and means for permitting a flow of cooling water through said passage and pipe when said apparatus is expelling refrigerant through its outlet.

28. In combination a condenser casing, an evaporator leading from said casing, an apparatus operative to draw expanded refrigerant from said evaporator and to expel it through an outlet, an intermediate casing leading upward from said outlet, a dehydrator leading upward from said intermediate casing, a check valve interposed at the top of said dehydrator, a gas pipe leading from said valve into said condenser casing, and means for permitting a flow of cooling water to said condenser casing and to said dehydrator when said apparatus is expelling refrigerant through its outlet.

29. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, means automatically operative at intervals to open said valves in a predetermined relation to each other, means automatically operative to subsequently close said valves, and means automatically operative for heating at intervals said still to a predetermined limit while said valves are closed.

30. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, means automatically operative at intervals to open said valves, means automatically operative to subsequently close said valves in a predetermined relation to each other, and means automatically operative for heating at intervals said still to a predetermined limit while said valves are closed.

31. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, means automatically operative at intervals to open said valves in a predetermined relation to each other and to close them in a predetermined relation to each other, and means automatically operative for heating at intervals said still to a predetermined limit while said valves are closed.

32. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, means automatically operative at intervals to open said valves simultaneously, means automatically operative to subsequently close said valves, and means automatically operative for heating at intervals said still to a predetermined limit while said valves are closed.

33. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, means automatically operative at intervals to open said valves, means automatically operative to subsequently close said valves simultaneously, and means automatically operative for heating at intervals said still to a predetermined limit while said valves are closed.

34. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, means automatically operative at intervals to open said valves simultaneously and to close them simultaneously, and means automatically operative for heating at intervals said still to a predetermined limit while said valves are closed.

35. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the inlet end of said evaporator, a thermostat at a low temperature limit controlled by the temperature about said evaporator and controlling said valve, means permitting a flow of cooling water to said still in its absorption period, and means operative for heating at intervals said still to a predetermined limit.

36. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means for starting at intervals a heating of said still, means for normally terminating such heating, and a safety device operating to stop such heating before its normal termination in case the pressure in said still rises above a normal limit.

37. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means for heating at intervals said still, means operating in the time of such heating when the pressure in said still exceeds a predetermined limit to permit a flow of cooling water to said condenser, and a safety device operating to stop such heating in case the pressure in said still in the time of heating rises above a normal limit higher than such predetermined limit.

38. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means operative for heating at intervals said still normally to a high temperature limit, and a safety device operating to stop such heating in case the pressure in said still in the time of heating rises above a normal limit.

39. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator, and its absorption in said still, means operative for heating at intervals said still normally to a high temperature limit, means operating in the time of such heating when the pressure of refrigerant expelled from such absorbent exceeds a predetermined limit to permit a flow of cooling water to said condenser, and a safety device operating to stop such heating in case the pressure in said still in the time of heating rises above a normal limit.

40. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means operative for heating at intervals said still normally to a high temperature limit, means operating in the time of such heating when the pressure in said still exceeds a predetermined limit to permit a flow of cooling water to said condenser, and a safety device operating to stop such heating in case the pressure in said still in the time of heating rises above a normal limit higher than such predetermined limit.

41. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator and its expansion within the evaporator, means for cooling the absorbent in said still in its absorption period to a predetermined limit, means terminating such absorption period when the pressure of absorbed refrigerant in said still rises to a predetermined limit, and means thereafter operative to heat said still.

42. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means terminating such absorption period when the pressure of absorbed refrigerant in said still rises to a predetermined limit, and means thereafter operative to heat said still to a predetermined limit and subsequently to start the operation of said regulating means.

43. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator and expansion within the evaporator, means for cooling the absorbent in said still in its absorption period to a predetermined limit, means terminating such absorption period when the pressure of absorbed refrigerant in said still rises to a predetermined limit, and means thereafter operative to heat said still to a predetermined limit and subsequently to start the operation of said regulating means.

44. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means for heating at intervals said still, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

45. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means for heating at intervals said still, means operating in the time of such heating when the pressure of refrigerant expelled from such absorbent exceeds a predetermined limit to permit a flow of cooling water to said condenser, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

46. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means operative for heating at intervals said still normally to a high temperature limit, a safety device operating to stop such heating in case the pressure in said still in the time of heating rises above a normal limit, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

47. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means operative for heating at intervals said still normally to a high temperature limit, means operating in the time of such heating when the pressure of refrigerant expelled from such absorbent exceeds a predetermined limit to permit a flow of cooling water to said condenser, a safety device operating to stop such heating in case the pressure in said still in the time of heating rises above a normal limit, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

48. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means terminating such absorption when the pressure of absorbed refrigerant in said still rises to a predetermined limit, and means thereupon operating, if there is a supply of condensing water, to start a heating of the still.

49. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means terminating such absorption when the pressure of absorbed refrigerant in said still rises to a predetermined limit, means thereupon operating, if there is a supply of condensing water, to start a heating of the still, and means operating in the time of such heating when the pressure of refrigerant expelled from such absorbent exceeds a predetermined limit to permit a flow of cooling water to said condenser.

50. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means terminating such absorption when the pressure of absorbed refrigerant in said still rises to a predetermined limit, means thereupon operating, if there is a supply of condensing water, to start a heating of the still to continue normally to a high temperature limit, and a safety device operating to stop such heating in case the pressure in said still in the time of heating rises above a normal limit.

51. In combination a condenser, an evaporator leading from said condenser, a still adapted to contain an absorbent and leading from said evaporator into said condenser, means for preventing a back flow of refrigerant from said condenser into said still and from said still into said evaporator, means for regulating the flow of refrigerant from said condenser into said evaporator, its expansion within the evaporator and its absorption in said still, means terminating such absorption when the pressure of absorbed refrigerant in said still rises to a predetermined limit, means thereupon operating, if there is a supply of cooling water, to start a heating of the still to continue normally to a high temperature limit, means operating in the time of such heating when the pressure of refrigerant expelled from such absorbent exceeds a predetermined limit to permit a flow of cooling water to said condenser, and a safety device operating to stop such heating in case the pressure in said still in the time of heating rises above a normal limit.

52. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means terminating such absorption when the pressure of absorbed refrigerant in said still rises to a predetermined limit, means thereupon operating, if there is a supply of condensing water, to start a heating of the still, a safety device operating to stop such heating in case the pressure in said still in the time of heating rises above a normal limit, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

53. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means terminating such absorption when the pressure of absorbed refrigerant in said still rises to a predetermined limit, means thereupon operating, if there is a supply of condensing water, to start a heating of the still, means operating in the time of such heating when the pressure of refrigerant expelled from such absorbent exceeds a predetermined limit to permit a flow of cooling water to said condenser, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

54. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, dominating means terminating such absorption when the pressure of absorbed refrigerant in said still rises to a predetermined limit, means thereupon operating, if there is a supply of condensing water, to start a heating of the still to continue normally to a high temperature limit, a safety device operating to stop such heating in case the pressure in said still in the time of heating rises above a normal limit, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

55. In combination a condenser, an evaporator leading from said condenser through a place to be refrigerated, a still adapted to contain an absorbent and leading from said evaporator into said condenser, means for preventing a back flow of refrigerant from said condenser into said still and from said still into said evaporator, evaporator means terminating such absorption when the pressure of absorbed refrigerant in said still rises to a predetermined limit, means thereupon operating, if there is a supply of condensing water, to start a heating of the still to continue normally to a high temperature limit, means operating in the time of such heating when the pressure of refrigerant expelled from such absorbent exceeds a predetermined limit to permit a flow of cooling water to said condenser, a safety device operating to stop such heating in case the pressure in said still in the time of heating rises above a normal limit, and refrigerant regulative means temperature controlled in the period between the operations of said dominating means and then operative to regulate the flow of refrigerant from said condenser into said evaporator, its expansion within the evaporator and its absorption in said still so as to maintain a predetermined temperature in said place, said dominating means during such heating also causing said regulative means to be inoperative.

56. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, and mechanism controlled by the temperature in said still in its absorption period and permitting in such period a flow of water through said passage.

57. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, and mechanism controlled by the temperature in said still in its absorption period and operating to permit in such period a flow of water through said passage sufficient to maintain a predetermined coolness in the still.

58. In combination a condenser, an evaporator leading from said condenser, a still having a cooling water passage leading upward therein and discharging therefrom, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, and means operating before such heating to close the inlet end of said passage and to drain the passage and controlled in the period between such heatings by the temperature in said still and then permitting a flow of water through the passage.

59. In combination a condenser, an evaporator leading from said condenser, a still having a cooling water passage leading upward therein and discharging therefrom, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, and means operating before such heating to close the inlet end of said passage and to drain the passage and controlled in the period between such heatings by the temperature in said still and then operating to permit a flow of water through the passage sufficient to maintain a predetermined coolness in the still.

60. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, means preventing a flow of refrigerant into said still during its heating and until after the still has cooled down to a predetermined limit, and mechanism controlled by the temperature in said still in its absorption period and then permitting a flow of water through said passage.

61. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, means preventing a flow of refrigerant into said still during its heating and until after the still has cooled down to a predetermined limit, and mechanism controlled by the temperature in said still in its absorption period, and then operating to permit a flow of water through said passage sufficient to maintain a predetermined coolness in the still.

62. In combination a condenser, an evaporator leading from said condenser, a still having a cooling water passage leading upward therein and discharging therefrom, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, means closing said valve during such heating and until after the still has cooled down to a predetermined limit, and means operating before such heating to close the inlet end of said passage and to drain the passage and controlled in the period between such heatings by the temperature in said still and then permitting a flow of water through said passage.

63. In combination a condenser, an evaporator leading from said condenser, a still having a cooling water passage leading upward therein and discharging therefrom, adapted to contain an absorbent and leading from said evaporator into said condenser, means for preventing a back flow of refrigerant from said condenser into said still and from said still into said evaporator, means for heating at intervals said still, a feed valve controlling the inlet end of said evaporator, means closing said valve during such heating and until after the still has cooled down to a predetermined limit, and means operating before such heating to close the inlet end of said passage and to drain the passage and controlled in the period between such heatings by the temperature in said still and then operating to permit a flow of water through said passage sufficient to maintain a predetermined coolness in the still.

64. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, dominating means operative for heating at intervals said still, a feed valve controlling the inlet end of said evaporator, a thermostat controlled by the temperature in said place and operating with a predetermined decrease of such temperature to close said valve, and mechanism controlled by the temperature in said still in its absorption period and then permitting a flow of water through said passage, said dominating means before such heating closing said valve and acting upon said mechanism to close the inlet end of said passage and to drain the passage and after such heating restoring the control of said mechanism to the temperature in said still and opening said valve unless said thermostat prevents.

65. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, dominating means operative for heating at intervals said still, a feed valve controlling the inlet end of said evaporator, a thermostat controlled by the temperature in said place and operating with a predetermined decrease of such temperature to close said valve, and mechanism controlled by the temperature in said still in its absorption period and then operating to permit a flow of water through said passage sufficient to maintain a predetermined coolness in the still, said dominating means before such heating closing said valve and acting upon said mechanism to close the inlet end of said passage and to drain the passage and after such heating restoring the control of said mechanism to the temperature in said still and opening said valve unless said thermostat prevents.

66. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, dominating means operative for heating at intervals said still to a predetermined limit, a feed valve controlling the inlet end of said evaporator, a thermostat controlled by the temperature in said place and operating with a predetermined decrease of such temperature to close said valve, and mechanism controlled by the temperature in said still in its absorption period and then permitting a flow of water through said passage, said dominating means before such heating closing said valve and acting upon said mechanism to close the inlet end of said passage and to drain the passage and upon a predetermined cooling down of said still after such heating restoring the control of said mechanism to the temperature in the still and opening the valve unless said thermostat prevents.

67. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, dominating means operative for heating at intervals said still to a predetermined limit, a feed valve controlling the inlet end of said evaporator, a thermostat controlled by the temperature in said place and operating with a predetermined decrease of such temperature to close said valve, and mechanism controlled by the temperature in said still in its absorption period and then operating to permit a flow of water through said passage sufficient to maintain a predetermined coolness in the still, said dominating means before such heating closing said valve and acting upon said mechanism to close the inlet end of said passage and to drain the passage and upon a predetermined cooling down of said still after such heating restoring the control of said mechanism to the temperature in the still and opening the valve unless said thermostat prevents.

68. In combination a condenser, an evaporator leading from said condenser, a still adapted to contain an absorbent and leading from said evaporator into said condenser, there being a valve seat between said evaporator and said still, means for preventing a back flow of refrigerant from said condenser into said still, means for regulating the flow of refrigerant from said condenser into said evaporator, its expansion within the evaporator and its absorption in said still, means for heating at intervals said still, a check valve tending to close said seat from its side toward said still, and means whereby the pressure of fluid in said still exerts force tending to close said valve in excess of the force represented by the pressure on the valve.

69. In combination a condenser, an evaporator leading from said condenser, a still adapted to contain an absorbent and leading from said evaporator into said condenser, there being a valve seat between said evaporator and said still, means for preventing a back flow of refrigerant from said condenser into said still, means for regulating the flow of refrigerant from said condenser into said evaporator, its expansion within the evaporator and its absorption in said still, means for heating at intervals said still, a check valve tending to close said seat, a diaphragm exposed on opposite sides to the pressure of fluid in said still and evaporator, and means whereby an excess of pressure in said still exerted on said diaphragm assists in seating said valve.

70. In combination a condenser, an evaporator leading from said condenser, a still adapted to contain an absorbent and leading from said evaporator into said condenser, there being a valve seat between said still and said condenser, means for preventing a back flow of refrigerant from said still into said evaporator, means for regulating the flow of refrigerant from said condenser into said evaporator, its expansion within the evaporator and its absorption in said still, means for heating at intervals said still, a check valve tending to close said seat from its side toward said condenser, and means whereby the pressure of fluid in said condenser exerts force tending to close said valve in excess of the force represented by the pressure on the valve.

71. In combination a condenser, an evaporator leading from said condenser, a still adapted to contain an absorbent and leading from said evaporator into said condenser; there being a valve seat between said still and said condenser, means for preventing a back flow of refrigerant from said still into said evaporator, means for regulating the flow of refrigerant from said condenser into said evaporator, its expansion within the evaporator and its absorption in said still, means for heating at intervals said still, a check tending to close said seat, a diaphragm exposed on opposite sides to the pressure of fluid in said condenser and still, and means whereby an excess of pressure in said condenser exerted on said diaphragm assists in seating said valve.

GEORGE P. CARROLL.

Witnesses:
WILLIAM N. PIKE,
CARL A. EDMOND.